(12) United States Patent
Burkin, Jr. et al.

(10) Patent No.: US 11,734,962 B2
(45) Date of Patent: Aug. 22, 2023

(54) VEHICLE MESSAGING SYSTEM AND METHOD OF OPERATION THEREOF

(71) Applicants: Donald Burkin, Jr., Perrysburg, OH (US); Jack Radke, Perrysburg, OH (US)

(72) Inventors: Donald Burkin, Jr., Perrysburg, OH (US); Jack Radke, Perrysburg, OH (US)

(73) Assignees: Christopher Straley, Odessa, FL (US); Daniel Moneypenny, Silver Lake, OH (US); Donovan A. Runkle, Monroe, MI (US); Jack William Runkle, Perrysburg, OH (US); Donald William Burkin, Jr., Perrsyburg, OH (US)

( * ) Notice: Subject to any disclaimer, the term of this patent is extended or adjusted under 35 U.S.C. 154(b) by 0 days.

(21) Appl. No.: 17/054,798

(22) PCT Filed: May 16, 2019

(86) PCT No.: PCT/US2019/032589
§ 371 (c)(1),
(2) Date: Nov. 12, 2020

(87) PCT Pub. No.: WO2019/222452
PCT Pub. Date: Nov. 21, 2019

(65) Prior Publication Data
US 2021/0258752 A1 Aug. 19, 2021

Related U.S. Application Data

(60) Provisional application No. 62/672,479, filed on May 16, 2018.

(51) Int. Cl.
*H04W 4/46* (2018.01)
*H04W 4/029* (2018.01)
(Continued)

(52) U.S. Cl.
CPC .............. *H04W 4/46* (2018.02); *B60Q 1/503* (2013.01); *G01C 21/28* (2013.01);
(Continued)

(58) Field of Classification Search
CPC ........ H04W 4/46; H04W 4/029; B60Q 1/503; B60Q 1/22; B60Q 1/44; G01C 21/3415;
(Continued)

(56) References Cited

U.S. PATENT DOCUMENTS 5,105,179 A * 4/1992 Smith ...................... B60Q 1/56
340/461
51,505,179  4/1992 Smith
(Continued)

*Primary Examiner* — Omar Casillashernandez
(74) *Attorney, Agent, or Firm* — Shumaker, Loop & Kendrick, LLP; Brenda Kruse

(57) ABSTRACT

A vehicle messaging system and method of operation thereof. The method of operating the vehicle messaging system includes first providing a vehicle messaging system. Once provided, a message to be displayed will be inputted into the vehicle messaging system by a vehicle operator and/or one or more users of the vehicle messaging system. After the message to be displayed has been inputted the vehicle operator and/or the one or more users will instruct the vehicle messaging system to display the message.

29 Claims, 10 Drawing Sheets

(51) Int. Cl.
  *B60Q 1/50* (2006.01)
  *G01C 21/28* (2006.01)
  *G01C 21/34* (2006.01)
  *G01C 21/36* (2006.01)
  *G08G 1/01* (2006.01)
  *H04L 67/1097* (2022.01)
  *B60K 35/00* (2006.01)
  *B60Q 1/22* (2006.01)
  *B60Q 1/44* (2006.01)

(52) U.S. Cl.
  CPC ..... *G01C 21/3415* (2013.01); *G01C 21/3691* (2013.01); *G08G 1/0112* (2013.01); *H04L 67/1097* (2013.01); *H04W 4/029* (2018.02); *B60K 35/00* (2013.01); *B60Q 1/22* (2013.01); *B60Q 1/44* (2013.01)

(58) Field of Classification Search
  CPC .. G01C 21/3691; G01C 21/28; G08G 1/0112; H04L 67/1097; B60K 35/00; G07C 5/008
  USPC .................................................. 340/435; 701/29
  See application file for complete search history.

(56) References Cited

U.S. PATENT DOCUMENTS

| | | | | |
|---|---|---|---|---|
| 5,905,434 | A * | 5/1999 | Steffan | B60Q 1/50 116/28 R |
| 6,300,870 | B1 * | 10/2001 | Nelson | B60Q 1/50 340/471 |
| 8,762,035 | B2 | 6/2014 | Levine | G01C 21/34 701/117 |
| 9,767,689 | B1 * | 9/2017 | Cain | G08G 1/096758 |
| 9,805,601 | B1 * | 10/2017 | Fields | H04N 5/33 |
| 2001/0012976 | A1 | 8/2001 | Menig et al. | |
| 2003/0201394 | A1 * | 10/2003 | Peoples | B66C 19/002 250/336.1 |
| 2004/0041706 | A1 * | 3/2004 | Stratmoen | G06Q 10/08 340/539.26 |
| 2004/0068364 | A1 * | 4/2004 | Zhao | G08G 1/096844 701/468 |
| 2005/0197844 | A1 * | 9/2005 | Ng | G06Q 10/0833 705/333 |
| 2005/0248456 | A1 * | 11/2005 | Britton | G08B 21/12 340/506 |
| 2005/0273232 | A1 * | 12/2005 | Hill | B60Q 1/50 701/1 |
| 2006/0112350 | A1 * | 5/2006 | Kato | G06F 3/0485 715/781 |
| 2007/0153356 | A1 * | 7/2007 | McCabe | B60R 1/088 359/265 |
| 2007/0159354 | A1 * | 7/2007 | Rosenberg | G08G 1/0965 340/902 |
| 2007/0276619 | A1 * | 11/2007 | Sugahara | B66C 13/16 702/81 |
| 2008/0046173 | A1 * | 2/2008 | Lappe | G01C 21/28 701/533 |
| 2008/0077309 | A1 * | 3/2008 | Cobbold | G06Q 10/10 701/117 |
| 2009/0164110 | A1 * | 6/2009 | Basir | G01C 21/362 701/117 |
| 2009/0234573 | A1 * | 9/2009 | Notarantonio | G06Q 30/0283 701/533 |
| 2010/0019479 | A1 * | 1/2010 | Haynes | B60Q 1/503 296/180.1 |
| 2010/0057336 | A1 * | 3/2010 | Levine | G01C 21/26 701/532 |
| 2010/0118146 | A1 * | 5/2010 | Schofield | B60R 1/00 348/148 |
| 2011/0167688 | A1 * | 7/2011 | Frost | G09F 13/08 40/541 |
| 2014/0302774 | A1 * | 10/2014 | Burke | G07C 5/08 455/3.05 |
| 2015/0015573 | A1 * | 1/2015 | Burtzlaff | G09G 3/003 345/581 |
| 2015/0296105 | A1 * | 10/2015 | De Geeter | H04N 7/18 348/373 |
| 2017/0032402 | A1 * | 2/2017 | Patsiokas | G06Q 30/0261 |
| 2017/0132855 | A1 * | 5/2017 | Kim | G01S 13/931 |
| 2017/0242148 | A1 * | 8/2017 | Yu | G06V 20/52 |
| 2018/0286231 | A1 * | 10/2018 | Muro-Calderon | H04W 4/46 |
| 2018/0310147 | A1 * | 10/2018 | Kim | H04W 4/40 |
| 2019/0051172 | A1 * | 2/2019 | Stenneth | H04W 4/44 |
| 2019/0061525 | A1 * | 2/2019 | Ji | B60W 50/14 |
| 2019/0161085 | A1 * | 5/2019 | Dudar | B60W 30/18009 |
| 2019/0286144 | A1 * | 9/2019 | Yasuda | G05D 1/021 |
| 2019/0303686 | A1 * | 10/2019 | Guo | G06T 7/70 |
| 2019/0351827 | A1 * | 11/2019 | Xue | G02B 5/30 |
| 2020/0153955 | A1 * | 5/2020 | Chen | H04M 1/72463 |
| 2021/0094577 | A1 * | 4/2021 | Shalev-Shwartz | G05D 1/0231 |

\* cited by examiner

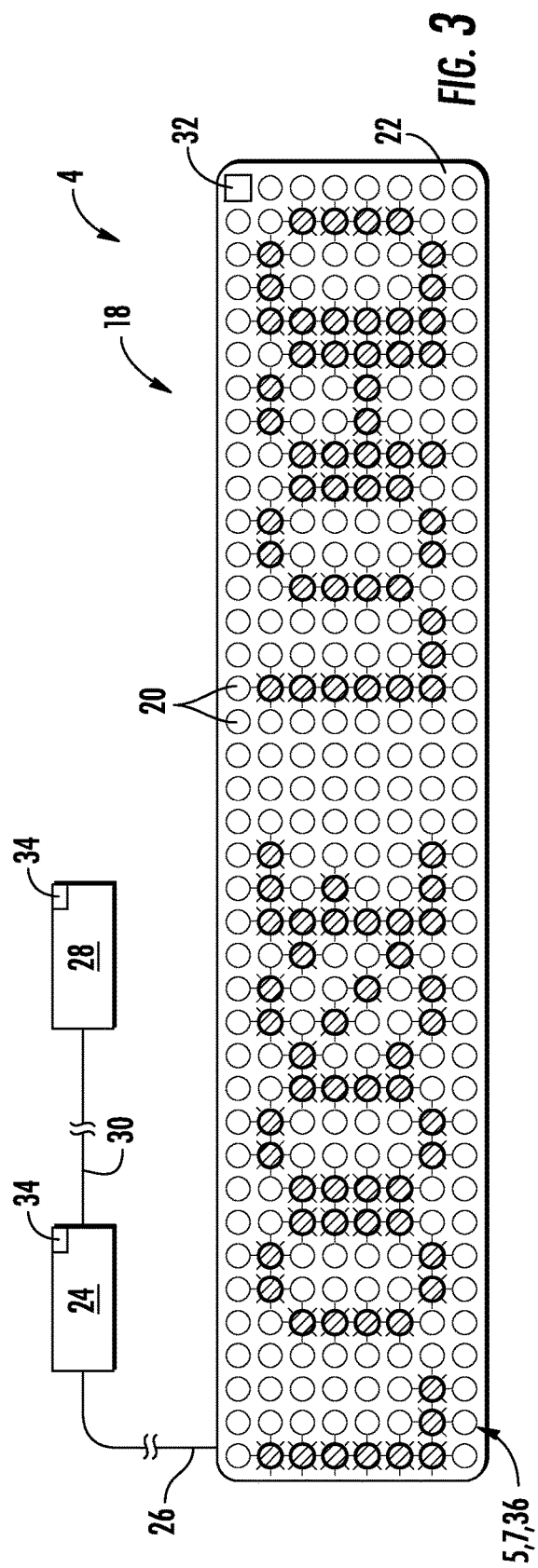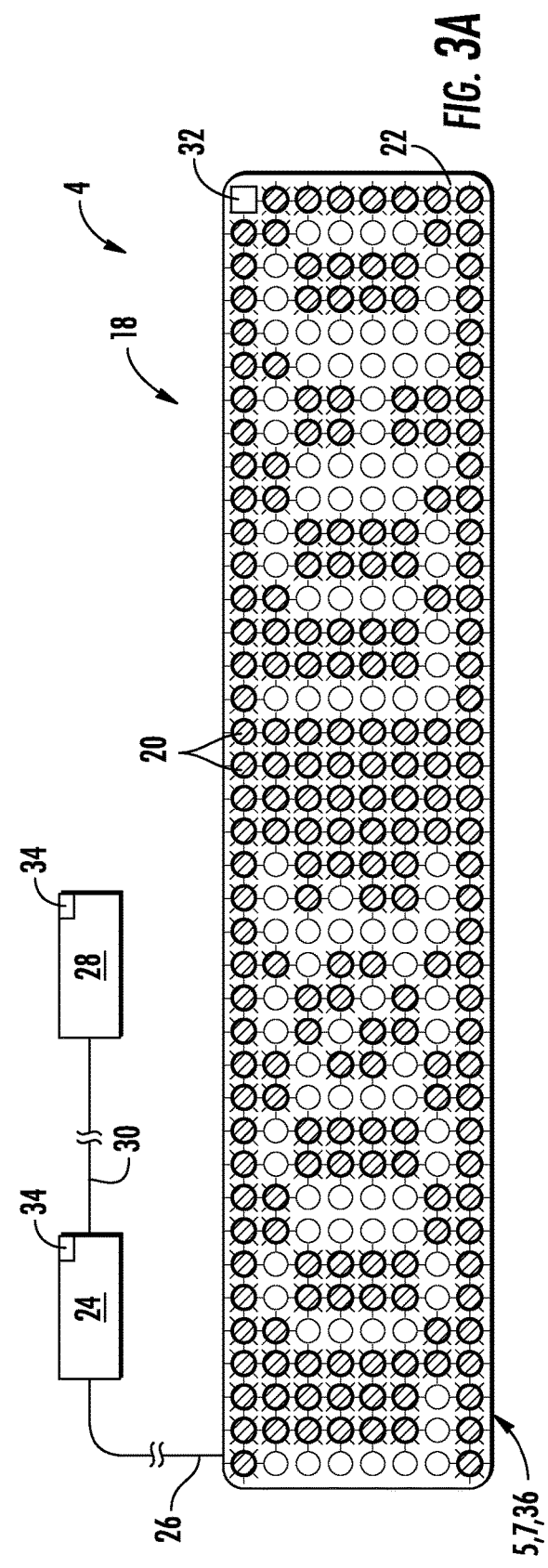

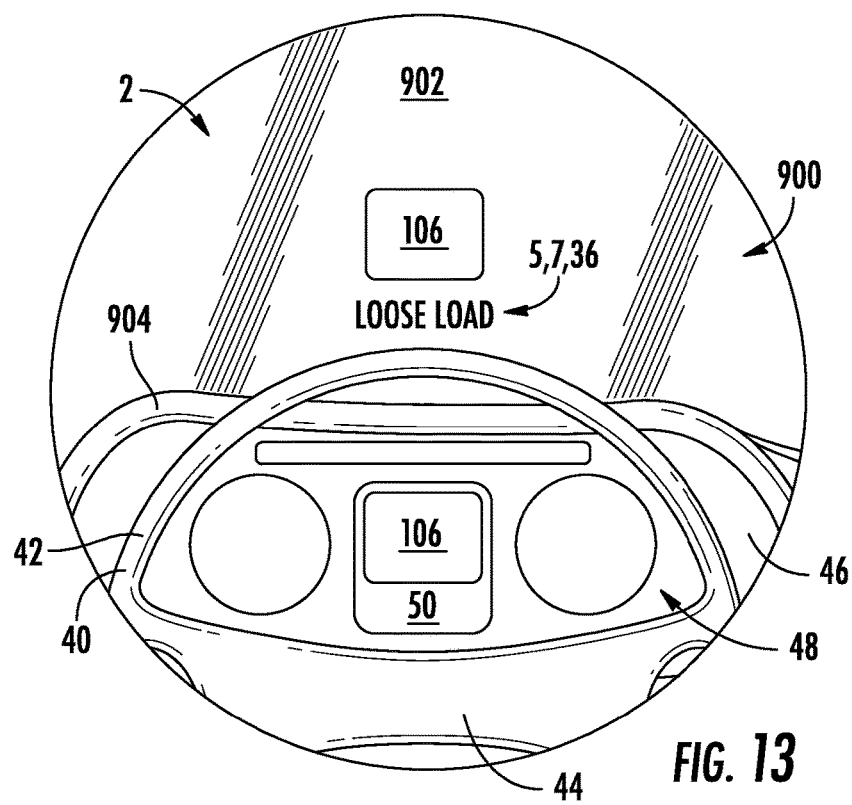
FIG. 13
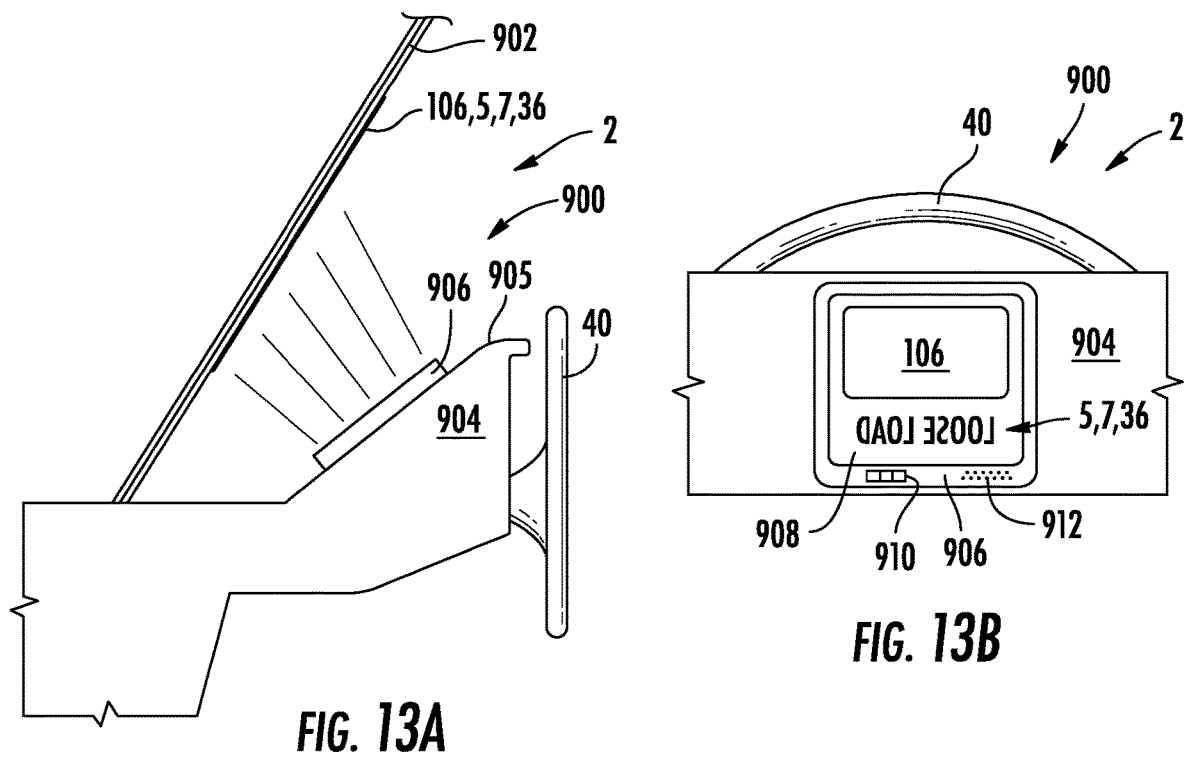
FIG. 13A
FIG. 13B

VEHICLE MESSAGING SYSTEM AND METHOD OF OPERATION THEREOF

CROSS-REFERENCE TO RELATED APPLICATIONS

The present application claims the benefit to U.S. Provisional Patent Application No. 62/672,479 filed on May 16, 2018, which is incorporated herein by reference in its entirety.

FIELD OF THE DISCLOSURE

The present disclosure relates to a messaging system and a method of operating the vehicle messaging system.

BACKGROUND OF THE DISCLOSURE

Conventional vehicle messaging systems suffer from a variety of draw backs that make them ineffective, impractical and/or unsafe to incorporate into a vehicle. For instance, conventional messaging systems are complex and require substantial modifications to the vehicle in order to accommodate the messaging system within the vehicle. As a result, this increases the overall costs associated with the vehicle messaging system. This tends to discourage consumers from incorporating the conventional messaging systems into their vehicles. Additionally, the modifications made to the vehicle in order to accommodate the messaging system may negatively affect the carefully engineered crash characteristics of the vehicle. Any alterations to the crash characteristics of the vehicle may cause death or injury to the passengers when the vehicle experiences a crash condition.

The conventional vehicle messaging systems also obstruct the vision of the operator and/or the passengers of the vehicle. As a result, this tends to limit the overall field of view of the operator and/or the passengers of the vehicle thereby making the vehicle more difficult to maneuver and dangerous to operate resulting in accidents that may cause death and/or injury.

Furthermore, the conventional messaging systems are complicated to operate. As a result, the conventional messaging systems are distracting and take the vehicle operators concentration away from the road for an undesirable amount of time. The more complicated the vehicle messaging system is to operate, the less time the vehicle operator is concentrating on the road. As a result, this tends to reduce the reaction time of the vehicle operator which may cause accidents resulting in death of injury.

It would therefore be advantageous to develop a vehicle messaging system and apparatus that is cost effective, easy to install, does not require modifications to the vehicle, does not obstruct vision and is easy to operate.

SUMMARY OF THE DISCLOSURE

A vehicle messaging system and method of operation thereof. The method of operating the vehicle messaging system includes first providing a vehicle messaging system. Once provided, a message to be displayed will be inputted into the vehicle messaging system by a vehicle operator and/or one or more users of the vehicle messaging system. After the message to be displayed has been inputted the vehicle operator and/or the one or more users will instruct the vehicle messaging system to display the message.

According to an aspect of the disclosure, the message inputted into the vehicle messaging system may be an alphabetic (or text based) message, an alphanumeric message, a graphical message, an advertising message, a traffic condition message, a road condition message, a vehicle error code message, vehicle operating condition message, a vehicle towing condition message, a greeting message, a political message, a sports slogan message, a quote message, an animated graphical message, a catch phrase message and/or a hashtag type message.

According to any of the previous aspects of the disclosure, the vehicle messaging system may further include the step of providing a display portion.

According to any of the previous aspects of the disclosure, the display portion of the vehicle messaging system may be installed in place of a third brake light of the vehicle.

According to any of the previous aspects of the disclosure, the display portion of the vehicle messaging system may include a support or housing member having a plurality of LEDs that are configured to display the message inputted into the vehicle messaging system by the vehicle operator and/or the one or more users of the vehicle messaging system.

According to any of the previous aspects of the disclosure, the display portion of the vehicle messaging system may include a display panel configured to display the message inputted into the vehicle messaging system by the vehicle operator and/or the one or more users of the vehicle messaging system.

According to any of the previous aspects of the disclosure, the display portion of the vehicle messaging system may include a brake light portion that is integrally connected to at least a portion of an outer periphery of the display portion of the vehicle messaging system.

According to any of the previous aspects of the disclosure, the display portion of the vehicle messaging system may include a reverse light or work light portion integrally connected to at least a portion of an outer periphery of the display portion of the vehicle messaging system.

According to any of the previous aspects of the disclosure, the display portion of the vehicle messaging system may further include one or more display portion sensors that are configured to continuously monitor an amount of ambient light and/or are configured to check the ambient light level. The method of operating the vehicle messaging system may include the step of communicating the data collected by the one or more display portion sensors relating to the ambient light level experienced by the display portion to one or more data processors. The one or more data processors may then be configured to determine the level or amount of ambient light experienced by the display portion. Additionally, the method of operating the vehicle messaging system may include the step of instructing the display portion to either increase or decrease a quantity of light emitted, brightness and/or intensity of the light emitted by the display portion based on the level or amount of ambient light experienced by the display portion.

According to any of the previous aspects of the disclosure, the vehicle messaging system method of operation may further include the step of overriding the message displayed by the display portion and wherein the message displayed ceases or stops being displayed upon application of an amount of force onto a brake pedal of the vehicle and/or by an instruction received by the operator of the vehicle and/or the one or more users of the vehicle messaging system.

According to any of the previous aspects of the disclosure, wherein upon application of an amount of force onto the brake pedal of the vehicle the display portion stops displaying the message and a brake light is displayed by the display portion of the vehicle messaging system.

According to any of the previous aspects of the disclosure, the vehicle messaging system method of operation may further include the step of providing a user interface. The user interface may be selectively navigable by the vehicle operator and/or the one or more users of the vehicle messaging system to select a message stored within the vehicle messaging system or to input a customized message for display by the display portion.

According to any of the previous aspects of the disclosure, the user interface of the vehicle messaging system may be displayed on an information display portion of the vehicle, on an infotainment system of the vehicle and/or on at least a portion of a windshield of the vehicle by a heads-up display portion.

According to any of the previous aspects of the disclosure, the vehicle messaging system method of operation may further include the step of providing a selector device. The selector device may allow the vehicle operator and/or the one or more users of the vehicle messaging system to select a stored message for display by the vehicle messaging system, input a customized message for display by the vehicle messaging system and/or navigate through the user interface of the vehicle messaging system.

According to any of the previous aspects of the disclosure, the selector device may be a button integrally connected to a steering wheel assembly of the vehicle, where the selector device may be attached to at least a portion of the steering wheel assembly of the vehicle, wherein the selector device may be a mobile phone and/or where the selector device may be a mobile computing device.

According to any of the previous aspects of the disclosure, the vehicle messaging system method of operation may further include the step of providing a telemetrics unit and/or a GPS unit and identifying a geographic location of the message displayed by the vehicle messaging system using the GPS unit. The vehicle messaging system method of operation may further include the step of transmitting the message to a cloud-based server by using the telemetrics unit and then analyzing the message transmitted by the cloud-based server to determine if the message relates to a road condition and/or a traffic condition. Additionally, the vehicle messaging system method of operation may further include the step of rerouting one or more vehicles based on the messages analyzed by the cloud-based server.

According to any of the previous aspects of the disclosure, the vehicle messaging system method of operation may further include the step of providing a telemetrics unit and/or a GPS unit. The messages inputted into the vehicle messaging system may be analyzed by the vehicle message system in order to determine if the message inputted relates to a road condition and/or a traffic condition. The method of operating the vehicle messaging system may further include the step of identifying a geographic location of the message inputted into the vehicle messaging system relating to a road condition and/or a traffic condition determined and transmitting the message to a cloud-based server by using the telemetrics unit. Additionally, the method of operating the vehicle messaging system may further include the step of rerouting one or more vehicles based on the messages analyzed by the vehicle messaging system and/or the cloud-based server.

According to any of the previous aspects of the disclosure, the vehicle messaging system method of operation may further include the step of providing one or more vehicle sensors and identifying a location of one or more nearby vehicles to the vehicle by the one or more vehicle sensors.

The method of operating the vehicle operating system may further include the step of selecting one or more of the one or more nearby vehicles identified and displaying the message on the user interface of the vehicle messaging system in the one or more nearby vehicles selected by the vehicle operator and/or the one or more users of the vehicle messaging system.

According to any one of the previous aspects of the disclosure, the vehicle messaging system may further include the steps of providing one or more vehicle sensors, one or more receivers and/or one or more transmitters and identifying one or more other vehicles that are equipped with a vehicle messaging system. Once identified, the location of the one or more other vehicles may be identified by using the one or more vehicle sensors of the vehicle messaging system. After being identified, the operator of the vehicle may select one or more of the one or more other vehicles identified and transmit the message inputted by the vehicle operator and/or the one or more users within the vehicle into the vehicle messaging system to the one or more other vehicles selected. Once transmitted, the message may be received and displayed by the user interface in the one or more other vehicles selected.

According to any one of the previous aspects of the disclosure, the vehicle messaging system wherein the one or more vehicle sensors are one or more infra-red sensors, one or more sonar sensors, one or more position sensors, and/or one or more vehicle position sensors.

According to any one of the previous aspects of the disclosure, the vehicle messaging system wherein the one or more other vehicles are identified by receiving a signal transmitted from the one or more other vehicles having the vehicle messaging system by the one or more receivers within the vehicle.

According to any one of the previous aspects of the disclosure, the vehicle messaging system may further include the step of identifying the vehicle that transmitted the message to the one or more other vehicles.

According to any one of the previous aspects of the disclosure, the vehicle messaging system may further include the steps of selecting the vehicle that transmitted the message to the one or more other vehicles and inputting a reply message into the vehicle messaging system of the one or more other vehicles. The reply message inputted may then be transmitted to said vehicle that sent the original message. Once transmitted, the reply message may be received by the vehicle that sent the original message and the reply message may be displayed within the user interface of the vehicle messaging system of the vehicle that sent the original message.

According to any one of the previous aspects of the disclosure, the vehicle messaging system may further include the steps of identifying the geographic location of the vehicle with a GPS unit. Once the geographic location has been identified, the message inputted by the vehicle operator and/or one or more users may be transmitted to a plurality other vehicles within a pre-determined radius from the vehicle. The message transmitted may be received by the plurality of other vehicles and the message may be displayed within the user interface of the plurality of other vehicles.

According to any one of the previous aspects of the disclosure, the vehicle messaging system may further include the steps of inputting a reply message by the vehicle operator and/or the one or more users of the vehicle messaging system within one or more of the plurality of other vehicles within the pre-determined radius from the vehicle. The reply message inputted into the vehicle messaging system within one or more of the plurality of other vehicles may then be transmitted from one or more of said plurality of other vehicles and received by the vehicle that sent the original message. Once received, the reply message(s) received may be displayed within the user interface of the vehicle that sent the original message.

According to any one of the previous aspects of the disclosure, the message transmitted by the vehicle messaging system within the vehicle may be received by a cloud-based server and then may be transmitted by the cloud-based server to a plurality of other vehicles within a pre-determined radius of the vehicle.

According to any one of the previous aspects of the disclosure, the reply message transmitted by one or more of the plurality of other vehicles may be received by the cloud-based server and then may be transmitted by the cloud-based server to the vehicle that transmitted the original message.

A display portion of a vehicle messaging system may include a support member or housing member that is installed in place of a third brake light of a vehicle.

According to any of the previous aspects of the disclosure, the support portion or housing portion of the display portion of the vehicle messaging system may include a plurality of LEDs that are configured to display a message.

According to any of the previous aspects of the disclosure, the support portion or housing portion of the display portion of the vehicle messaging system may house at least a portion of a display panel.

According to any of the previous aspects of the disclosure, the display panel of the display portion of the vehicle messaging system may be a liquid crystal display panel, a plasma display panel, an organic light emitting diode (OLED) display panel, an active matrix organic light emitting diode (AMOLED) display panel and/or a quantum dot display panel.

According to any of the previous aspects of the disclosure, the display portion of the vehicle messaging system may further include a brake light portion that is integrally connected to at least a portion of the support portion or housing portion.

According to any of the previous aspects of the disclosure, the display portion of the vehicle messaging system may further include a reverse light or work light portion that is integrally connected to at least a portion of the support portion or housing portion.

According to any of the previous aspects of the disclosure, the display portion of the vehicle messaging system may further include one or more display portion sensors where the one or more display portion sensors are one or more photo-sensors, photo-detectors, one or more ambient light sensors and/or one or more light sensors configured to monitor an amount of ambient light experienced by the display portion.

A selector device for a vehicle messaging system may include a housing attached to at least a portion of a steering wheel assembly of a vehicle. The selector device of the vehicle messaging system may further include a switch mechanism disposed within at least a portion of the housing. Additionally, the selector device may be in communication with the vehicle messaging system.

According to any of the previous aspects of the disclosure, the switch mechanism of the selector device may be one or more depressible buttons, one or more push-buttons, one or more directional push buttons, one or more scroll wheels, one or more depressible scroll wheels, one or more switches, one or more rocker switches, one or more toggle switches, one or more joysticks and/or one or more depressible joysticks.

According to any of the previous aspects of the disclosure, the selector device of the vehicle messaging system may include a selector device microphone that is configured to receive a customized message audibly spoken by a vehicle operator and/or one or more users of the vehicle messaging system to be displayed by the vehicle messaging system.

According to any of the previous aspects of the disclosure, the selector device of the vehicle messaging system may include a keyboard that is disposed within at least a portion of the housing of the selector device. The keyboard may be selectively operable by the vehicle operator in order to type in a customized message for display by the vehicle messaging system According to any of the previous aspects of the disclosure, the selector device may include a selector device display portion that is configured to display at least a portion of a user interface of the vehicle messaging system.

According to any of the previous aspects of the disclosure, the housing of the selector device of the vehicle messaging system may include a first housing portion and a second housing portion that are attached to at least a portion of the steering wheel assembly of the vehicle. The first and second housing portion of the selector device may include a switch mechanism, a selector device microphone and/or a first keyboard portion. The switch mechanism in the first and/or second housing portion of the selector device is one or more depressible buttons, one or more push-buttons, one or more directional push buttons, one or more scroll wheels, one or more depressible scroll wheels, one or more switches, one or more rocker switches, one or more toggle switches, one or more joysticks and/or one or more depressible joysticks.

According to any of the previous aspects of the disclosure, the selector device may be configured to navigate a user interface of the vehicle messaging system.

BRIEF DESCRIPTION OF THE DRAWINGS

The above, as well as other advantages of the present disclosure, will become readily apparent to those skilled in the art from the following detailed description when considered in light of the accompanying drawings in which:

FIG. 3 is a schematic top-plan view of a display unit of the vehicle messaging system according to an embodiment of the disclosure;

FIG. 3A is a schematic top-plan view of the display unit illustrated in FIG. 3 of the disclosure;

FIG. 13 is a schematic front facing of a portion of the vehicle having a vehicle messaging system according to an embodiment of the disclosure;

FIG. 13A is a schematic side-view of a portion of the vehicle having the vehicle messaging system according to the embodiment illustrated in FIG. 13 of the disclosure;

FIG. 13B is a schematic rearward facing view of a portion of the vehicle having the vehicle messaging system according to the embodiment illustrated in FIGS. 13 and 13A of the disclosure;

DETAILED DESCRIPTION OF THE DISCLOSURE

It is to be understood that the invention may assume various alternative orientations and step sequences, except where expressly specified to the contrary. It is also understood that the specific devices and processes illustrated in the attached drawings, and described in the specification are simply exemplary embodiments of the inventive concepts disclosed and defined herein. Hence, specific dimensions, directions or other physical characteristics relating to the various embodiments disclosed are not to be considered as limiting, unless expressly stated otherwise.

It is within the scope of this disclosure, and as a non-limiting example, that the vehicle messaging system and method of operating the vehicle messaging system disclosed herein may be used in automotive, off-road vehicle, all-terrain vehicle, construction, structural, marine, aerospace, locomotive, military, machinery, robotic and/or consumer product applications. Additionally, as a non-limiting example, the vehicle messaging system and method of operating the vehicle messaging system disclosed herein may also be used in passenger vehicle, electric vehicle, hybrid vehicle, commercial vehicle, autonomous vehicles, semi-autonomous vehicles and/or heavy vehicle applications.

Figure 1:
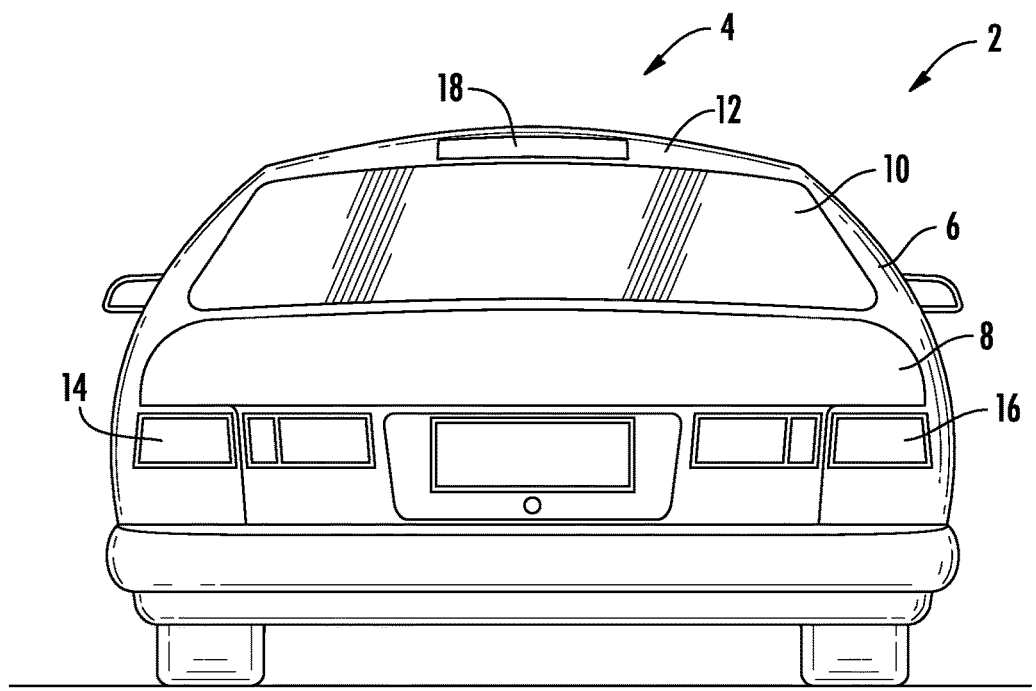
FIG. 1 is a schematic rear-view of a vehicle having a vehicle messaging system according to an embodiment of the disclosure.

FIGS. 1-4 provide a schematic illustration of a vehicle 2 having a vehicle messaging system 4 according to an embodiment of the disclosure. As best seen in FIG. 1 of the disclosure and as a non-limiting example, the vehicle 2 includes a rearward portion 6 having a trunk portion 8, a rear window 10, a roof portion 12, a first taillight assembly 14 and/or a second taillight assembly 16. Additionally, as best seen in FIG. 1 of the disclosure and as a non-limiting example, the rearward portion 6 of the vehicle 2 may include a display portion 18 of the vehicle messaging system 4. It is within the scope of this disclosure and as a non-limiting example that at least a portion of the display portion 18 may be located radially outboard from and/or axially off-set from at least a portion of the first and second taillight assemblies 14 and 16 of the vehicle 2. In accordance with the embodiment of the disclosure illustrated in FIG. 1 and as a non-limiting example, the display portion 18 may be installed in place of the third brake light (not shown). As a result, it is to be understood that the display portion 18 of the vehicle messaging system 4 may be installed on the vehicle 2 to replace the third brake light (not shown).

According to the embodiment illustrated in FIGS. 3 and 3A and as a non-limiting example, the display portion 18 of the vehicle messaging system 4 may include a plurality of light-emitting diodes (LEDs) 20. At least a portion of the plurality of LEDs 20 may be integrally connected to at least a portion of a support member or housing member 22. The support member or housing member 22 may be used in order to provide an amount of structural support or structural rigidity for the plurality of LEDs 20 and/or the display portion 18 of the vehicle messaging system 4. It is within the scope of this disclosure and as a non-limiting example that one or more of the plurality of LEDs 20 of the display portion 18 may be mono-chromatic and/or polychromatic. As a result, it is to be understood that one or more of the plurality of LEDs 20 may be of a type only able to emit a single colour of light and/or one or more of the plurality of LEDs 20 may be of a type able to emit two or more colours of light.

One or more control units 24 of the vehicle 2 may be in communication with at least a portion of the display portion 18 and the plurality of LEDs 20 of the vehicle messaging system 4. The one or more control units 24 may be used to provide instructions to the display portion 18 of the vehicle messaging system 4 indicating: which of the plurality of LEDs 20 to turn on, which of the plurality of LEDs 20 to turn off, when to turn the plurality of LEDs 20 on and off, and/or what colour of light one or more of the plurality of LEDs 20 should emit. In accordance with the embodiment illustrated in FIGS. 3 and 3A and as a non-limiting example, the one or more control units 24 may be in communication with the display portion 18 and the plurality of LEDs 20 by using one or more control unit data-links 26.

According to an alternative embodiment of the disclosure (not shown) and as a non-limiting example, the one or more control units 24 may be in wireless communication with the display portion 18 and the plurality of LEDs 20 of the vehicle messaging system 4. As a non-limiting example the display portion 18 and the plurality of LEDs 20 may be wireless communication with the one or more control units 24 by using a Wi-Fi connection, a Bluetooth connection, an electromagnetic wave connection, a cellular connection, a radio wave connection and/or any other type of communication that does not require a wired connection or communication between the one or more control units 24 and the display portion 18.

In accordance with the embodiment of the disclosure illustrated in FIGS. 3 and 3A and as a non-limiting example, the one or more control units 24 and/or the display portion 18 of the vehicle messaging system 4 may be in communication with a communication bus 28 of the vehicle 2. The communication bus 28 is a specialized internal communication network that interconnects the various components found in the vehicle 2. It is within the scope of this disclosure and as a non-limiting example that the communication bus 28 may be a controller area network (CAN Bus). The CAN bus is a type of communication bus 28 that is designed to allow the various micro-controllers, control units and devices within the vehicle 2 to communicate with each other without the need for a host computer. As a non-limiting example, the communication bus 28 may be in communication with the one or more control units 24 and/or the display portion 18 by using one or more communication bus data-links 30.

According to an alternative embodiment of the disclosure (not shown) and as a non-limiting example, the communication bus 28 may be in wireless communication with the one or more control units 24 and/or display portion 18 of the vehicle messaging system 4. As a non-limiting example the display portion 18 and the one or more control units 24 may be wireless communication with the communication bus 28 by using a Wi-Fi connection, a Bluetooth connection, an electromagnetic wave connection, a cellular connection, a radio wave connection and/or any other type of communication that does not require a wired connection or communication between communication bus 28 and the one or more control units 24 and/or display portion 18.

The display portion 18 of the vehicle messaging system 4 may further include the use of one or more display portion sensors 32. As illustrated in FIGS. 3 and 3A of the disclosure and as a non-limiting example, the one or more display portion sensors 32 may be integrally connected to at least a portion of the support member or housing member 22. It is within the scope of this disclosure and as a non-limiting example that the one or more display portion sensors 32 may be one or more photo-sensors, photo-detectors, one or more ambient light sensors and/or one or more light sensors. The one or more display portion sensors 32 may be configured to continuously monitor an amount of ambient light or check the ambient light level at pre-determined intervals.

The data collected by the one or more display portion sensors 32 may be collected and/or analyzed by one or more data processors 34. As illustrated in FIGS. 3 and 3A of the disclosure and as a non-limiting example, the one or more data processors 34 may be in communication with the one or more control units 24 and/or the communication bus 28 of the vehicle 2. It is to be understood that the one or more data processors 34 may be configured to determine the level or amount of ambient light experienced by the display portion 18 of the vehicle messaging system 4. Based on the level or amount of ambient light determined by the one or more data processors 34, the one or more control units 24 and/or the communication bus 28 will instruct the plurality of LEDs 20 to either increase or decrease the quantity of light emitted, the brightness and/or the intensity of the light emitted by the plurality of LEDs 20. This aids in ensuring that at all times and in all operating conditions the plurality of LEDs 20 of the display portion 18 are emitting enough light to clearly and efficiently communicate a message 36 to nearby vehicle operators (not shown) and vehicle passengers (not shown).

It is within the scope of this disclosure and as a non-limiting example that the message 36 may be an alphabetic (or text based) message, an alphanumeric message, a graphical message, a multiple level message, a static message, a scrolling message and/or an advertising message. As a result, it is within the scope of this disclosure and as a non-limiting example that the message 36 may relate to a traffic condition, a road condition, vehicle error codes, vehicle operating conditions (e.g. "flat tire", "vehicle smoking" or "exhaust dragging"), vehicle towing conditions (e.g. "loose load" or "parts flying out"), greetings, political messages, sports slogans, quotes, an animated graphical display, catch phrases, hashtags and/or questions to other motorists.

Figure 2:
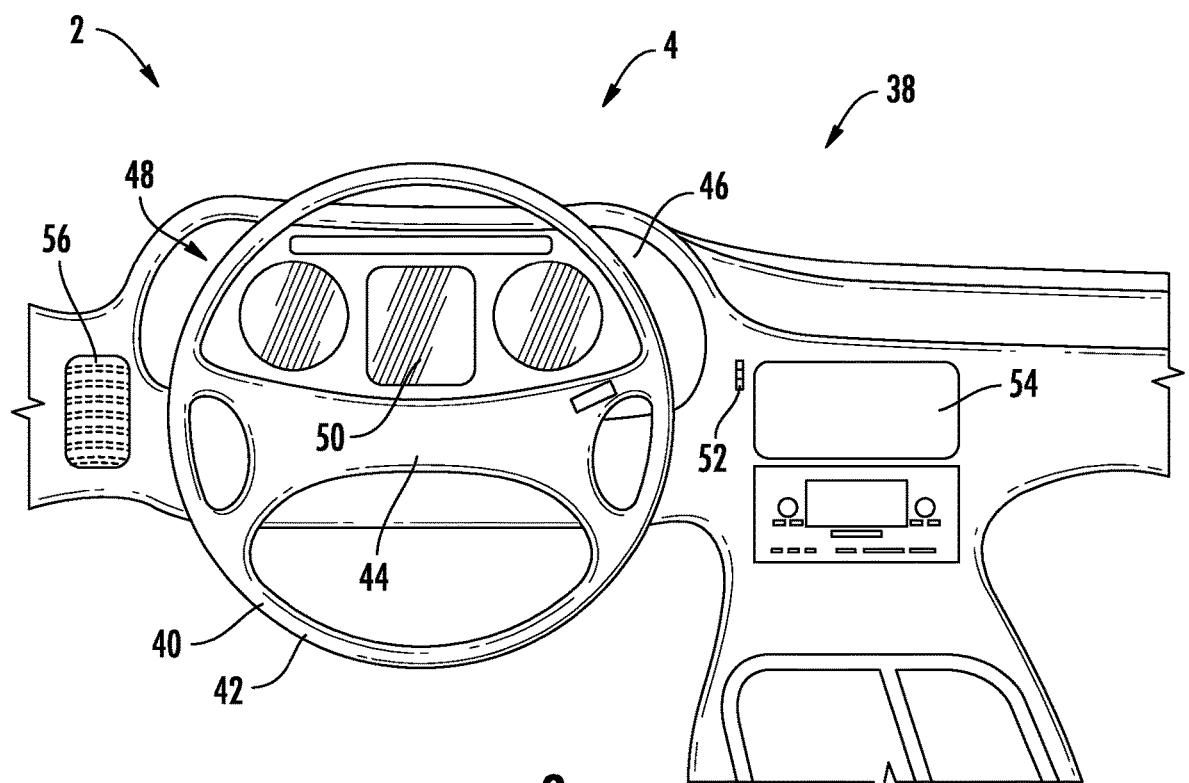
FIG. 2 is a schematic front facing view of a portion of an interior of the vehicle illustrated in FIG. 1 having the vehicle messaging system according to an embodiment of the disclosure.

As best seen in FIG. 2 of the disclosure and as a non-limiting example, the vehicle 2 includes an interior portion 38. The interior portion 38 of the vehicle 2 may include a steering wheel assembly 40. It is to be understood that the steering wheel assembly 40 may be connected to a steering system (not shown) of the vehicle 2 and may be selectively manipulatable by a operator (not shown) of the vehicle 2. In accordance with the embodiment illustrated in FIG. 2 and as a non-limiting example, the steering wheel assembly 40 may include an outer portion 42 and an inner hub portion 44. At least a portion of the inner hub portion 44 of the steering wheel assembly 40 may be integrally connected to at least a portion of the steering system (not shown) of the vehicle 2 and the outer portion 42 of the steering wheel assembly 40.

The interior portion 38 of the vehicle 2 may further include a dashboard 46. In accordance with the embodiment illustrated in FIG. 2 of the disclosure and as a non-limiting example, the dashboard 46 of the vehicle 2 may include an instrument cluster 48. It is within the scope of this disclosure and as a non-limiting example that the instrument cluster 48 of the vehicle 2 may be an electronic instrument cluster, a digital instrument panel, a digital dashboard and/or a multimedia interface.

As best seen in FIG. 2 and as a non-limiting example, the instrument cluster 48 and/or the dashboard 46 of the vehicle 2 may include an information display portion 50. The information display portion 50 of the vehicle 2 may provide the vehicle operator (not shown) with information relating to the operating status of the vehicle, communication information and/or messaging information. It is therefore to be understood that the information display portion 50 may function as at least a portion of the user interface of the vehicle messaging system 4 that the vehicle operator (not shown) may selectively operate and/or navigate during operation of the vehicle messaging system 4. By having the information display portion 50 and a portion of the user interface of the vehicle messaging system 4 located in the dashboard 46 of the vehicle 2, it reduces the overall amount of time needed to read and/or navigate the information provided to the information display portion 50 by the vehicle messaging system 4. This aids in increasing the overall safety associated with the operation of the vehicle 2 and the vehicle messaging system 4 by minimizing the overall amount of time the vehicle operator (not shown) needs to take their eyes off the road to interact with the vehicle messaging system 4. As a non-limiting example, the information display portion 50 of the vehicle messaging system 4 may be able to display alphabetic (or text based) messages, an alphanumeric messages, a graphical messages, a multiple level messages, a static messages, scrolling messages, an advertising messages and/or any other type of message provided by the vehicle messaging system 4.

The interior portion 38 of the vehicle 2 may further include one or more vehicle microphones 52. The one or more vehicle microphones 52 may be located anywhere within the interior portion 38 of the vehicle 2 that will ensure a clean and/or clear conversion of the sound generated by the operator (not shown) of the vehicle messaging system 4 into electrical signals that may be processed by one or more data processors (not shown) of the vehicle messaging system 4, the one or more data processors (not shown) of the one or more vehicle microphones 52, one or more data processors 34 of the one or more control units 24, and/or the one or more data processors 34 of the communication bus 28.

Additionally, the interior portion 38 of the vehicle 2 may include an infotainment system 54. As a non-limiting example, the infotainment system 54 of the vehicle 2 may provide the vehicle operator (not shown) with communication information and/or information from the vehicle messaging system 4. It is therefore to be understood that the infotainment system 54 may function as at least a portion of the user interface for the operator (not shown) of the vehicle messaging system 4. As a result, it is therefore to be understood that the operator (not shown) of the vehicle messaging system 4 may selectively operate and/or navigate the vehicle messaging system 4 through the infotainment system 54 of the vehicle 2. By having the infotainment system 54 located between the vehicle operator (not shown) and the passenger (not shown) of the vehicle 2, it reduces the overall amount of time needed to read and/or navigate the information provided to the infotainment system 54 by the vehicle messaging system 4. This aids in increasing the overall safety associated with the operation of the vehicle 2 and the vehicle messaging system 4 by minimizing the amount of time the vehicle operator (not shown) needs to take their eyes off the road to interact with the vehicle messaging system 4. As a non-limiting example, the infotainment system 54 of the vehicle messaging system 4 may be able to display alphabetic (or text based) messages, an alphanumeric messages, a graphical messages, a multiple level messages, a static messages, scrolling messages, an advertising messages and/or another type of message provided by the vehicle messaging system 4.

Figure 4:
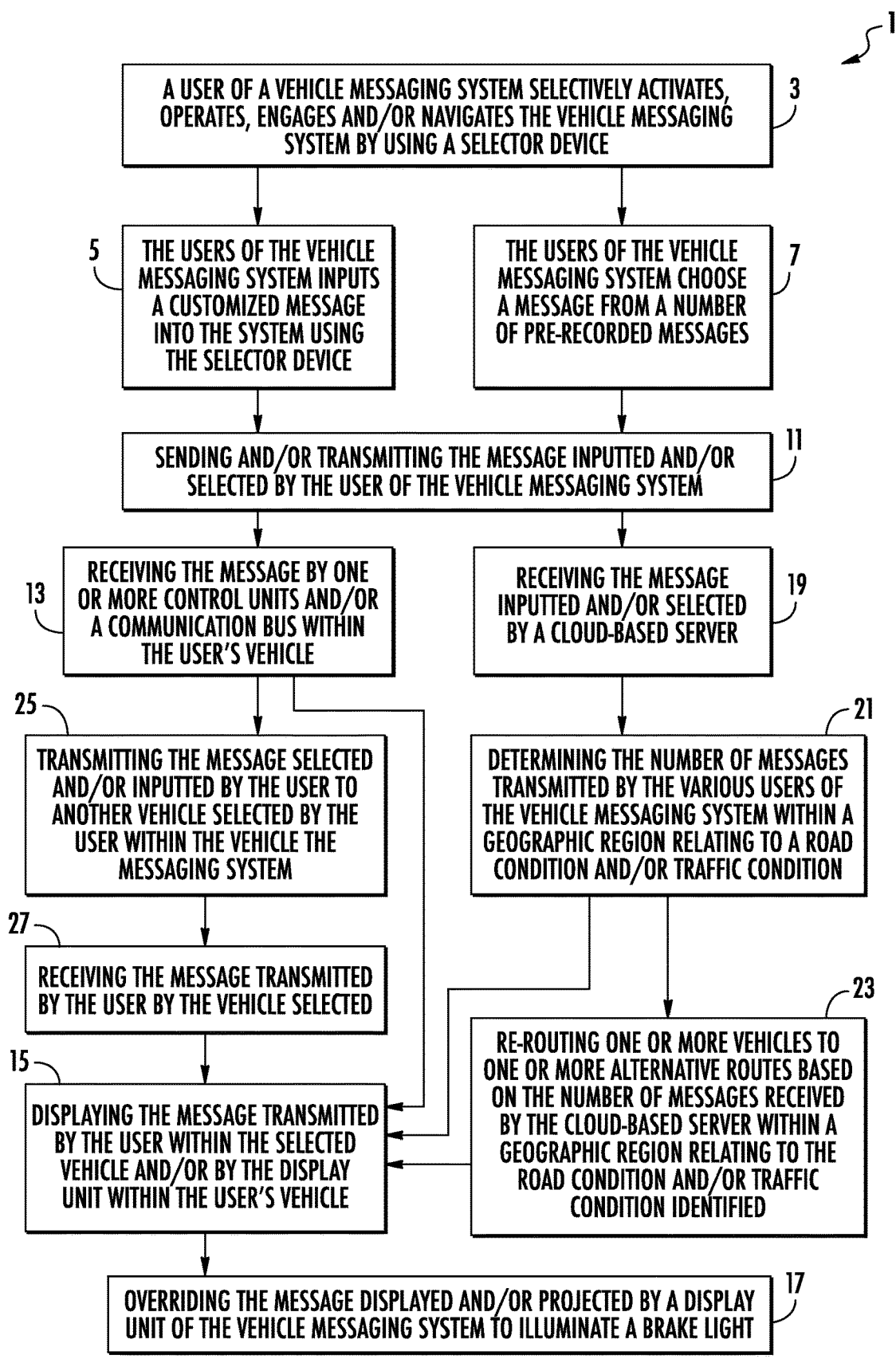
FIG. 4 is a flow chart illustrating the vehicle messaging system according to an embodiment of the disclosure.

FIG. 4 provides a flow chart illustrating a method of using the vehicle messaging system 1 according to one or more of the embodiments of the disclosure. As best seen in FIG. 4 of the disclosure and as a non-limiting example, one or more users (not shown) of the vehicle messaging system 4 may selectively activate, operate, engage and/or navigate 3 the vehicle messaging system 4 by using a selector device. According to an embodiment of the disclosure and as a non-limiting example, the selector device may be the one or more vehicle microphones 52, an artificial intelligence (not shown), and/or virtual assistant (not shown) installed within the vehicle 2. As a non-limiting example, the artificial intelligence (not shown), and/or virtual assistant (not shown) installed within the vehicle 2 may be an Amazon Alexa, Apple Siri, Google Cortana and/or any other type of interactive artificial intelligence or virtual assistant that is capable of performing one or more functions based on one or more instructions provided by the user (not shown) of the vehicle messaging system 4. In accordance with this embodiment of the disclosure and as a non-limiting example, the one or more users (not shown) of the vehicle messaging system 4 may audibly speak a pre-determined activation phrase. The activation phrase may be received by the one or more vehicle microphones 52, the artificial intelligence, and/or virtual assistant installed within the vehicle 2 and then analyzed by the one or more data processors 34 of the communication bus 28, the one or more control units 24, and/or the vehicle messaging system 4. It is within the scope of this disclosure and as a non-limiting example that the activation phrase for the vehicle messaging system 4 may be "open vehicle messaging board", "open vehicle messaging system", "open messaging system", "open vehicle communication system", "activate vehicle messaging board", "activate vehicle messaging system", "activate messaging system", "activate vehicle communication system" and/or any other type of activation phrase that indicates that the user (not shown) intends to utilize the vehicle messaging system 4.

Once the activation phrase has been identified to have been received by the vehicle messaging system 4, the vehicle messaging system 4 may interact with and/or navigate the one or more users (not shown) through the user interface of the vehicle messaging system 4 through one or more speakers 56 within the interior portion 38 of the vehicle 2. It is within the scope of this disclosure and as a non-limiting example that the artificial intelligence, and/or virtual assistant installed within the vehicle 2 and utilized by the vehicle messaging system 4 may interact with and/or navigate the one or more users (not shown) through the user interface of the vehicle messaging system 4. As a non-limiting example, the vehicle messaging system 4, through the one or more speakers 56 in the vehicle 2 may instruct the user (not shown) to speak a customized message and/or to select a message from a number of updatable, installable, standard pre-loaded, and/or pre-recorded messages. In the event that the one or more users (not shown) of the vehicle messaging system 4 wish to input a customized message 5 for use by the vehicle messaging system 4, the vehicle messaging system 4 may instruct the one or more users (not shown) to speak the customized message aloud. The customized message spoken by the one or more users (not shown), may be received by the one or more vehicle microphones 52, the artificial intelligence, and/or virtual assistant installed within the vehicle 2 and then analyzed by one or more data processors of the vehicle messaging system 4.

In the event that the one or more users (not shown) wish to input a previously installed message, pre-recorded message, and/or a standard pre-loaded message 7, the vehicle messaging system 4, may interact with and/or navigate the one or more users (not shown) through the user interface of the vehicle messaging system 4 to select the desired message 7. As previously discussed, it is within the scope of this disclosure and as a non-limiting example that the artificial intelligence, and/or virtual assistant installed within the vehicle 2 and utilized by the vehicle messaging system 4 may interact with and/or navigate the one or more users (not shown) through the user interface to select the desired message 7. It is within the scope of this disclosure and as a non-limiting example that the previously installed messages, pre-recorded messages, and/or standard pre-loaded messages 7 may be audibly read out to the one or more users (not shown) through the one or more speakers 56 and/or displayed within the vehicle 2 to be read by the one or more users (not shown) prior to being selected and inputted into the vehicle messaging system 4.

According to an embodiment of the disclosure and as a non-limiting example, once the message has been inputted into, received and/or recorded by the vehicle messaging system 4, the vehicle messaging system 4 may audibly read the message 5 and/or 7 back to the one or more users (not shown) through the one or more speakers 56 in the vehicle 2 and/or may display the message 5 and/or 7 within the vehicle 2 to be read. This will provide the one or more users (not shown) with an opportunity to confirm whether or not the message 5 and/or 7 was correctly interpreted and/or analyzed by the vehicle messaging system 4 before any further action is taken by the vehicle messaging system 4. Additionally, this aids in ensuring that the message 5 and/or 7 displayed and/or transmitted by the vehicle messaging system 4 is the message 5 and/or 7 intended to be displayed and/or transmitted by the one or more users (not shown) of the vehicle messaging system 4.

If the custom message, previously installed message, pre-recorded message, and/or standard pre-loaded message 5 and/or 7 inputted into the vehicle messaging system 4 was correctly received and/or interpreted, then the vehicle messaging system 4 may send and/or transmit 11 the message to the one or more control units 24 and/or the communication bus 28. The one or more control units 24 and/or the communication bus 28 may then instruct the display portion 18 of the vehicle messaging system 4 to display the one or more user's (not shown) message 5 and/or 7 inputted. It is within the scope of this disclosure and as a non-limiting example that the vehicle messaging system 4 may send and/or transmit 11 the message 5 and/or 7 to the one or more control units 24 and/or the communication bus 28 by using a wired connection and/or by wirelessly communicating the message to the one or more control units 24 and/or the communication bus 28. As a non-limiting example, the wireless communication between the vehicle messaging system 4 and the one or more control units 24 and/or communication bus 28 may be a Wi-Fi connection, a Bluetooth connection, an electromagnetic wave connection, a cellular connection and/or a radio wave connection.

Once the custom message, previously installed message, pre-recorded message, and/or standard pre-loaded message 5 and/or 7 has been received 13 by the one or more control units 24 and/or the communication bus 28, the one or more control units 24 and/or the communication bus 28 may instruct the display portion 18 of the vehicle messaging system 4 to display 15 the desired message 5 and/or 7. This will allow the custom, previously installed, pre-recorded, and/or standard pre-loaded 5 and/or 7 inputted into the vehicle messaging system 4 by the one or more users (not shown) to be read by one or more nearby vehicle operators (not shown) and/or vehicle passengers (not shown).

In the event that the message was incorrectly interpreted and/or analyzed by the vehicle messaging system 4 or the one or more users (not shown) no longer wishes to use the previous message 5 and/or 7, the one or more users (not shown) may instruct the vehicle messaging system 4 to discard and/or delete the message 5 and/or 7 previously inputted. Once the previous message 5 and/or 7 has been discarded and/or deleted, the vehicle messaging system 4 may instruct the one or more users (not shown) to audibly speak a customized message 5 or to select another previously installed, pre-recorded, and/or standard pre-loaded message 7. This cycle will continue until the message 5 and/or 7 received by the vehicle messaging system 4 has been confirmed as correct by the one or more users (not shown) of the vehicle messaging system 4. This provides the one or more users (not shown) of the vehicle messaging system 4 with one or more opportunities to confirm whether or not the message 5 and/or 7 was correctly interpreted and/or analyzed by the vehicle messaging system 4 before being displayed and/or transmitted. As a result, this aids in ensuring that the message 5 and/or 7 displayed 15 by the vehicle messaging system 4 is the message intended by the one or more users (not shown).

According to an embodiment of the disclosure and as a non-limiting example, the vehicle messaging system 4 may provide the one or more users (not shown) with an opportunity to add to their message 5 and/or 7 before being displayed and/or transmitted. Once the full and complete message 5 and/or 7 has been correctly received and/or interpreted by the vehicle messaging system 4, the vehicle messaging system 4 will send and/or transmit 11 the message to the one or more control units 24 and/or communication bus 28. Once received 13 by the one or more control units 24 and/or the communication bus 28, the one or more control units 24 and/or the communication bus 28 may instruct the display portion 18 to display 15 the message 5 and/or 7 inputted by the one or more users (not shown) into the vehicle messaging system 4. The message 5 and/or 7 may then be read by one or more nearby vehicle operators (not shown) and/or vehicle passengers (not shown).

If the one or more users (not shown) of the vehicle messaging system 4 wish to use a pre-recorded message, a previously installed message, a previously uploaded message and/or a previously downloaded message 7 that has been stored within a hard drive (not shown) of the vehicle messaging system 4, the vehicle messaging system 4 may read through or display the list of stored messages 7. It is within the scope of this disclosure and as a non-limiting example that the one or more pre-recorded, a previously installed, a previously uploaded and/or a previously downloaded messages 7 may be audibly read through the one or more speakers 56 or displayed within the vehicle 2 to be read by the one or more users (not shown). Once the one or more users (not shown) have selected and/or inputted the stored message 7 they would like to have displayed 15, the vehicle messaging system 4 may send and/or transmit 11 the message 7 to the one or more control units 24 and/or the communication bus 28. After the message 7 has been received 13 by the one or more control units 24 and/or communication bus 28, the one or more control units 24 and/or communication bus 28 may then instruct the display portion 18 to display 15 the selected message 7. As previously discussed, it is within the scope of this disclosure and as a non-limiting example that the vehicle messaging system 4 may send and/or transmit 11 the selected message 7 to the one or more control units 24 and/or the communication bus 28 by using a wired connection and/or by wirelessly communicating the message 7 to the one or more control units 24 and/or the communication bus 28. Once displayed 15, the message 7 may then be read by one or more nearby vehicle operators (not shown) and/or vehicle passengers (not shown).

Once the one or more data processors 24 and/or the communication bus 28 have instructed the display portion 18 to display 15 the message 5 and/or 7, the message 5 and/or 7 may be continuously displayed 15 for a pre-determined amount of time. Upon the expiration of the pre-determined amount of time, the one or more control units 24 and/or the communication bus 28 may instruct the display portion 18 to stop displaying 15 the message 5 and/or 7 inputted into the vehicle messaging system 4 by the one or more users (not shown). It is to be understood that the amount of time the display portion 18 displays 15 the message 5 and/or 7, may depend on the overall length of the message inputted and/or selected 5 and/or 7 by the one or more users (not shown) of the vehicle messaging system 4. For example, a longer message may be displayed for a longer amount of time than a shorter message. It is within the scope of this disclosure and as a non-limiting example that the one or more users (not shown) of the vehicle messaging system 4, may select the duration or amount of time in which the message 5 and/or 7 is displayed 15 by the display portion 18. Additionally, it is within the scope of this disclosure and as a non-limiting example that the one or more users (not shown) may instruct the vehicle messaging system 4 to turn off and discontinue displaying 15 the message 5 and/or 7 at any time.

When the operator (not shown) of the vehicle 2 engages the brake pedal (not shown) installed within the vehicle 2, the vehicle messaging system 4 may instruct the one or more control units 24 and/or the communication bus 28 to instruct the display portion 18 to stop displaying 17 the message 5 and/or 7 being displayed 15. This allows the vehicle 2 to override the control that the vehicle messaging systems 4 has on the display portion 18, thereby allowing the vehicle 2 to assume full functionality, control and normal operation of the display portion 18. As a result, it is therefore to be understood that this allows the vehicle 2 to control and instruct the display portion 18 of the vehicle messaging system 4 to function as the third brake light of the vehicle 2. This ensures that the vehicle 2 retains all of the functionality and safety associated with the incorporation of a third brake light into the vehicle 2.

It is within the scope of this disclosure and as a non-limiting example, that the one or more users (not shown) of the vehicle messaging system 4 may utilize the brake pedal (not shown) installed within the vehicle 2 as a way to clear or stop displaying 17 the message 5 and/or 7 displayed 15 by the display portion 18. Once the brake pedal (not shown) has been depressed, actuated or engaged by the operator (not shown) of the vehicle 2, the message will clear or stop being displayed 17 by the display portion 18. This will allow the operator (not shown) of the vehicle 2 to clear 17 the message 5 and/or 7 being displayed 15 by the vehicle messaging system 4 before the expiration of the pre-determined or chosen display time for the message 5 and/or 7. As a result, this improves the overall safety associated with the operation of the vehicle 2 and the vehicle messaging system 4 by minimizing the overall amount of time the operator (not shown) of the vehicle 2 needs to take their eyes off the road to interact with the vehicle messaging system 4.

Additionally, it is within the scope of this disclosure and as a non-limiting example that the message 5 and/or 7 being displayed 15 by the display portion 18 of the vehicle messaging system 4 may re-appear and be displayed 15 again after the operator (not shown) has depressed, actuated or engaged the brake pedal (not shown) of the vehicle 2.

Furthermore, it is within the scope of this disclosure and as a non-limiting example that the vehicle messaging system 4 may include one or more accelerometers (not shown). The one or more accelerometers (not shown) of the vehicle messaging system 4 may be used in order to confirm that the vehicle 2 is being slowed and/or stopped by the operator (not shown) of the vehicle 2 before relinquishing control of the display portion 18 to the vehicle 2. Once the one or more control units 24 and/or the communication bus 28 of the vehicle messaging system 4 has determined that the g-force measured by the one or more accelerometers (not shown) has exceeded a pre-determined threshold, the vehicle messaging system 4 may relinquish control of the display portion 18 to the vehicle 2 for functionality as a third brake light. This will aid in preventing the discontinuation 17 of the display 15 of the message 5 and/or 7 by the display portion 18 due to one or more accidental engagements of the brake pedal (not shown) by the operator (not shown) of the vehicle 2 thereby providing a more robust and reliable vehicle messaging system 4.

Figure 5:
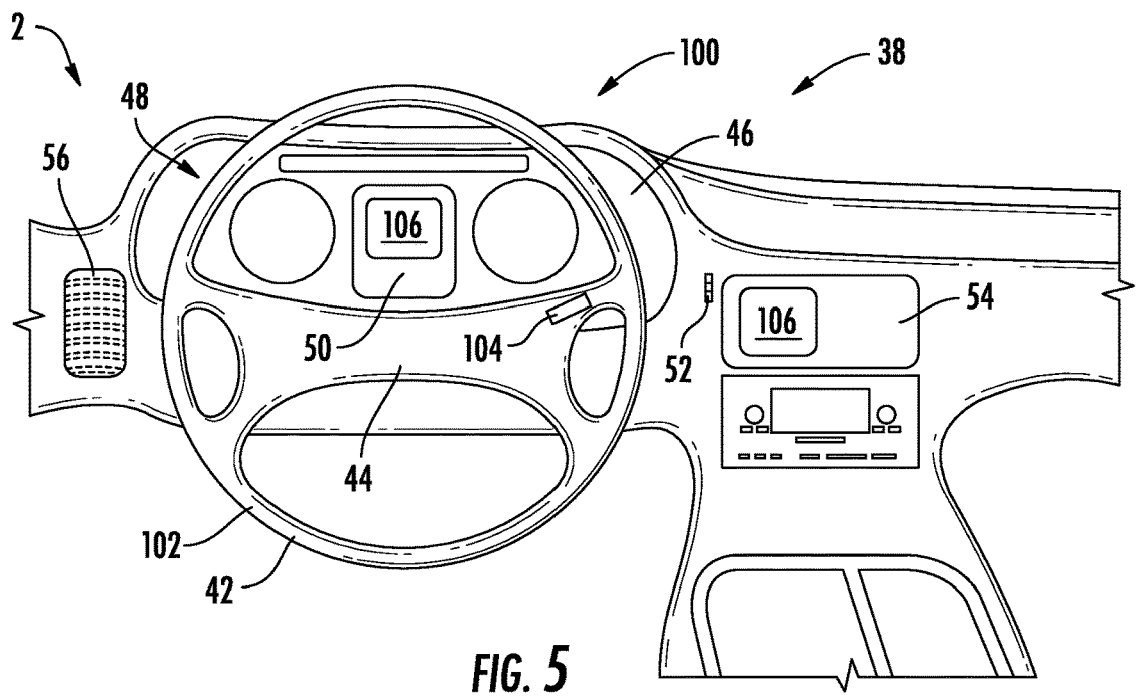
FIG. 5 is a schematic front facing view of a portion of the interior of the vehicle illustrated in FIG. 2 having a vehicle messaging system according to an alternative embodiment of the disclosure.

FIG. 5 is a schematic front facing view of a portion of the interior portion 38 of the vehicle 2 having a vehicle messaging system 100 according to an alternative embodiment of the disclosure. The vehicle messaging system 4 illustrated in FIGS. 1-4 is the same as the vehicle messaging system 100 illustrated in FIG. 5, except where specifically noted below. As illustrated in FIG. 5 of the disclosure and as a non-limiting example, the vehicle 2 may include a steering wheel assembly 102.

At least a portion of a selector device 104 of the vehicle messaging system 100 may be integrally connected to at least a portion of the inner hub portion 44 of the steering wheel assembly 102. As previously discussed, the selector device 104 may be selectively operated by the operator (not shown) of the vehicle 2 in order to activate, operate, engage and/or navigate the vehicle message system 100. It is within the scope of this disclosure and as a non-limiting example that the selector device 104 may be a depressible button, a push-button, a scroll wheel, a depressible scroll wheel, a switch, a rocker switch, a toggle switch, a joystick and/or a depressible joystick.

In accordance with the embodiment illustrated in FIG. 5 and as a non-limiting example, the one or more users (not shown) of vehicle messaging system 100 may activate 3 the vehicle messaging system 100 by depressing the selector device 104. Once the vehicle messaging system 100 has been activated 3, the vehicle messaging system 100 may operate as previously described in relation to FIGS. 1-4 of the disclosure.

As a non-limiting example, upon activation 3 of the vehicle messaging system 100, a user interface 106 may be displayed in the information display portion 50 of the dashboard 46 and/or the infotainment system 54 of the vehicle 2. According to the embodiment where the user interface 106 is displayed on the information display portion 50 of the dashboard 46, the vehicle operator (not shown) may navigate through the various screens of the user interface 106 by using the selector device 104 of the vehicle messaging system 100. By using the selector device 104 the operator (not shown) of the vehicle 2 may be able to select one or more messages 7 that have been stored within the hard drive (not shown) of the vehicle messaging system 100 to be displayed 15 via the display portion 18.

Additionally, by using the selector device 104 the operator (not shown) of the vehicle 2 may be able to select to input a customized message 5 that will be displayed 15 via the display portion 18 of the vehicle messaging system 100. According to an embodiment of the disclosure and as a non-limiting example, once the vehicle messaging system 104 has been activated 3, the vehicle messaging system 100 may instruct the operator (not shown) of the vehicle 2 and/or the one or more users (not shown) of the vehicle messaging system 100 to audibly speak a message 5 to be displayed 15 by the display portion 18. Once the vehicle operator (not shown) and/or the one or more users (not shown) have stopped speaking into the one or more microphones 52 and/or the vehicle operator (not shown) has depressed the selector device 104 the vehicle messaging system 100, the one or more control units 24, the communication bus 28, artificial intelligence, and/or virtual assistant may stop recording the message 5. The message 5 may then be played by the one or more speakers 56 installed within the vehicle 2 and/or displayed on the user interface 106 in the information display portion 50 or the infotainment system 54 for confirmation that the vehicle messaging system 100 has correctly analyzed and/or interpreted the message 5. After the vehicle operator (not shown) and/or the one or more users (not shown) of the vehicle messaging system 100 have indicated that the correct message 5 has been received by the vehicle messaging system 100, the vehicle messaging system 100 may instruct the one or more control units 24 and/or the communication bus 28 to have the display portion 18 display 15 the message 5.

In accordance with an alternative embodiment of the disclosure and as a non-limiting example, once the vehicle messaging system 100 has been activated 3, the operator (not shown) of the vehicle 2 may depress and hold down the selector device 104 while the vehicle operator (not shown) and/or the one or more users (not shown) audibly speak the desired message 5 into the one or more microphones 52. When the operator (not shown) of the vehicle 2 and/or the one or more users (not shown) have finished speaking the desired message 5 to be displayed 15, the operator (not shown) of the vehicle 2 may let go of or release the selector device 104. Once the operator (not shown) of the vehicle 2 has let go of or released the selector device 104, the one or more vehicle microphones 52 of the vehicle messaging system 100 will stop recording the message 5. The message 5 recorded may then be played by the one or more speakers 56 installed within the vehicle 2 and/or displayed on the user interface 106 in the information display portion 50 and/or the infotainment system 54 of the vehicle 2 for confirmation that the vehicle messaging system 100 has correctly analyzed and interpreted the message 5. After the operator (not shown) of the vehicle 2 and/or the one or more users (not shown) have indicated that the correct message 5 has been received by the vehicle messaging system 100, the vehicle messaging system 100 may instruct the one or more control units 24 and/or the communication bus 28 to have the display portion 18 display 15 the message 5.

According to the embodiment where the user interface 106 is displayed on the infotainment system 54, the operator (not shown) of the vehicle 2 and/or the one or more users (not shown) of the vehicle messaging system 100 may navigate the various screens of the user interface 106 by interacting with the infotainment system 54 and/or by selectively engaging the selection device 104. By interacting with the infotainment system 54 and/or by selectively engaging the selection device 104, the operator (not shown) of the vehicle 2 and/or the one or more users (not shown) may select one or more messages 7 stored within the hard drive (not shown) of the vehicle messaging system 100 and/or a customized message 5 for display 15. If the operator (not shown) of the vehicle 2 and/or the one or more users (not shown) select to display 15 a customized message 5, after the message has been recorded, it may be displayed on the infotainment system 54 and/or the information display portion 50 for confirmation that the vehicle messaging system 100 correctly analyzed and interpreted the message 5. Once confirmed correct, the operation (not shown) of the vehicle 2 and/or the one or more users (not shown) may interact with the selector device 104 and/or the infotainment system 54 to have the vehicle messaging system 100 display 15 the message 5 on the display portion 18.

Figure 6:
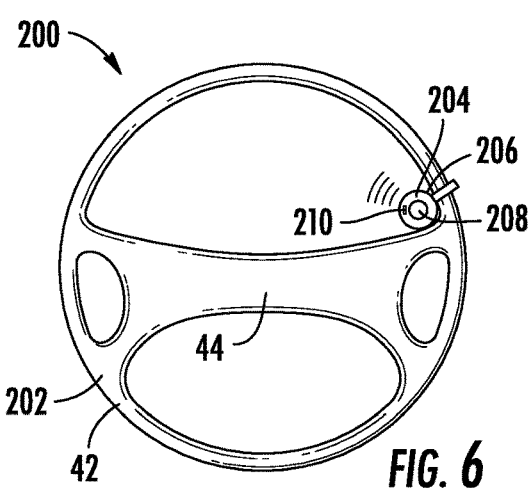
FIG. 6 is a schematic top-plan view of a steering wheel assembly having a selector device according to an alternative embodiment of the disclosure.

FIG. 6 is a schematic top-plan view of a steering wheel assembly 202 having a selector device 204 according to an alternative embodiment of the disclosure. The selector device 204 of the vehicle messaging system 200 illustrated in FIG. 6 is the same as the selector devices of the vehicle messaging systems 4 and 100 described and illustrated in relation to FIGS. 1-5, except where specifically noted below.

Additionally, the vehicle messaging system 200 illustrated in FIG. 6 is the same as the vehicle messaging systems 4 and 100, except where specifically noted below. As illustrated in FIG. 6 of the disclosure and as a non-limiting example, the selector device 204 may be attached to at least a portion of the outer portion 42 and/or the inner hub portion 44 of the steering wheel assembly 202. It is to be understood that the selector device 204 may be in communication with the vehicle messaging system 200 via a wireless connection and/or by using a wired connection. As a non-limiting example, the selector device 204 may be in wireless communication with the vehicle messaging system 200 by using a Wi-Fi connection, a Bluetooth connection, an electromagnetic wave connection, a cellular connection and/or a radio wave connection.

In accordance with the embodiment illustrated in FIG. 6 and as a non-limiting example, the selector device 204 includes a housing 206. Disposed within at least a portion of the housing 206 of the selector device 204 is switch mechanism 208. The switch mechanism 208 is selectively engageable by the operator (not shown) of the vehicle 2 in order to activate 3 the vehicle messaging system 200, to navigate through the user interface 106 of the vehicle messaging system 200 and/or interact with the vehicle messaging system 200 to have the display portion 18 display 15 a message 5 and/or 7. It is to be understood that the selector device 204 may be used to select one or more messages 7 stored within the hard drive (not shown) of the vehicle messaging system 200 and/or a customized message 5 to be displayed 15 via the display portion 18 of the vehicle messaging system 200. It is within the scope of this disclosure and as a non-limiting example that the switch mechanism 208 may be a push-button, a scroll wheel, a depressible scroll wheel, a switch, a rocker switch and/or a toggle switch.

It is within the scope of this disclosure and as a non-limiting example that the selector device 204 illustrated in FIG. 6 may include a selector device microphone 210. As illustrated in FIG. 6 of the disclosure and as a non-limiting example, the selector device microphone 210 may be disposed within at least a portion of the housing 206 of the selector device 204. In accordance with this embodiment of the disclosure and as a non-limiting example, the selector device microphone 210 may be used in order to receive and/or record the customized message 5 desired to be displayed 15 by the operator (not shown) of the vehicle 2 and/or the one or more users (not shown) of the vehicle messaging system 200.

Figure 7:
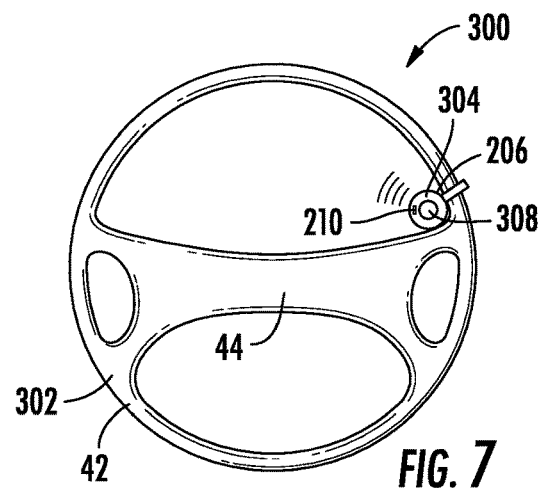
FIG. 7 is a schematic top-plan view of another steering wheel assembly having a selector device according to another embodiment of the disclosure.

FIG. 7 is a schematic top-plan view of another steering wheel assembly 302 having a selector device 304 according to another embodiment of the disclosure. The selector device 304 of the vehicle messaging system 300 illustrated in FIG. 7 is the same as the selector devices of the vehicle messaging systems 4, 100 and 200 described and illustrated in relation to FIGS. 1-6, except where specifically noted below. Additionally, the vehicle messaging system 300 illustrated in FIG. 7 is the same as the vehicle messaging systems 4, 100 and 200 described and illustrated in relation to FIGS. 1-6, except where specifically noted below. As illustrated in FIG. 7 of the disclosure and as a non-limiting example, the selector device 304 of the vehicle messaging system 300 may be attached to at least a portion of the outer portion 42 and/or the inner hub portion 44 of the steering wheel assembly 302. It is to be understood that the selector device 304 may be in communication with the vehicle messaging system 300 via a wireless connection and/or by using a wired connection. As a non-limiting example, the selector device 304 may be in wireless communication with the vehicle messaging system 300 by using a Wi-Fi connection, a Bluetooth connection, an electromagnetic wave connection, a cellular connection and/or a radio wave connection.

In accordance with the embodiment illustrated in FIG. 7 and as a non-limiting example, the selector device 304 may include a switch mechanism 308 disposed within at least a portion of the housing 206 of the selector device 304. The switch mechanism 308 may be selectively engageable by the operator (not shown) of the vehicle 2 in order to activate 3 the vehicle messaging system 300, to navigate through the user interface 106 of the vehicle messaging system 300 and/or interact with the vehicle messaging system 300 to have the display portion 18 display 15 a message 5 and/or 7. It is to be understood that the selector device 304 may be used to select one or more messages 7 stored within the hard drive (not shown) of the vehicle messaging system 300 and/or a customized message 5 to be displayed 15 via the display portion 18. It is within the scope of this disclosure and as a non-limiting example that the switch mechanism 308 may be a joystick and/or a depressible joystick.

Figure 8:
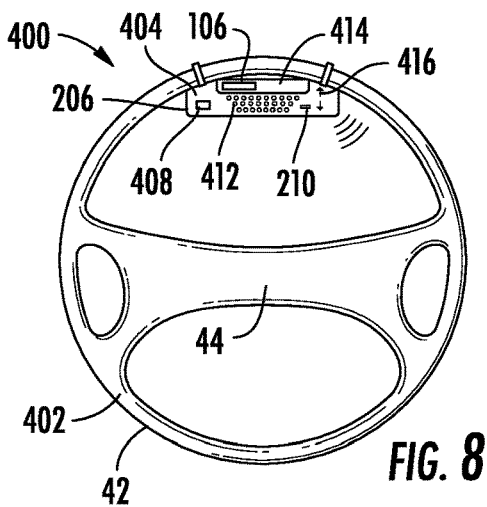
FIG. 8 is a schematic top-plan view of yet another steering wheel assembly having a selector device according to yet another embodiment of the disclosure.

FIG. 8 is a schematic top-plan view of yet another steering wheel assembly 402 having a selector device 404 according to yet another embodiment of the disclosure. The selector device 404 of the vehicle messaging system 400 illustrated in FIG. 8 is the same as the selector devices of the vehicle messaging systems 4, 100, 200 and 300 described and illustrated in relation to FIGS. 1-7, except where specifically noted below. Additionally, the vehicle messaging system 400 illustrated in FIG. 8 is the same as the vehicle messaging systems 4, 100, 200 and 300 described and illustrated in relation to FIGS. 1-7, except where specifically noted below. As illustrated in FIG. 8 and as a non-limiting example, the selector device 404 of the vehicle messaging system 400 may be attached to at least a portion of the outer portion 42 and/or the inner hub portion 44 of the steering wheel assembly 402. It is to be understood that the selector device 404 may be in communication with the vehicle messaging system 400 via a wireless connection and/or a wired connection. As a non-limiting example, the selector device 404 may be in wireless communication with the vehicle messaging system 400 by using a Wi-Fi connection, a Bluetooth connection, an electromagnetic wave connection, a cellular connection and/or a radio wave connection.

In accordance with the embodiment of the disclosure illustrated in FIG. 8 and as a non-limiting example, the selector device 404 may include a switch mechanism 408 that is disposed within at least a portion of the housing 206 of the selector device 404. The switch mechanism 408 may be selectively engageable by the operator (not shown) of the vehicle 2 in order to activate 3 the vehicle messaging system 400, to navigate through the user interface 106 of the vehicle messaging system 400 and/or interact with the vehicle messaging system 400 to have the display portion 18 display 15 a message 5 and/or 7. It is to be understood that the selector device 404 may be used to select one or more messages 7 stored within the hard drive (not shown) of the vehicle messaging system 400 and/or a customized message 5 to be displayed 15 via the display portion 18. As a non-limiting example, the switch mechanism 408 may be a depressible button, a push-button, a scroll wheel, a depressible scroll wheel, a switch, a rocker switch, a toggle switch, a joystick and/or a depressible joystick.

The selector device 404 may include a keyboard 412. As illustrated in FIG. 8 of the disclosure and as a non-limiting example, the keyboard 412 of the selector device 404 may include a plurality of push-buttons that are disposed within at least a portion of the housing 206. The keyboard 412 of the selector device 404 mat be selectively engageable by the operator (not shown) of the vehicle 2 in order to type in a customized message 5 into the vehicle messaging system 400 to be displayed 15 by the display portion 18. It is within the scope of this disclosure and as a non-limiting example that the keyboard 412 may be an alphanumeric keyboard.

Once the message 5 has been typed into the selector device 404 of the vehicle messaging system 400, the message 5 may be displayed on a selector device display portion 414 housed within the selector device 404, the information display portion 50 and/or the infotainment system 54 for confirmation before the message 5 is displayed 15 by the display portion 18. As best seen in FIG. 8 and as a non-limiting example, at least a portion of the selector device display portion 414 may be received and/or retained within at least a portion of the housing 206 of the selector device 404. The selector device display portion 414 may be configured to display 15 a customized message 5 that is inputted into the vehicle message system 400 via the selector device microphone 210 and/or the keyboard 412 for confirmation before the message 5 and/or 7 is displayed 15 on the display portion 18.

According to an embodiment of the disclosure and as a non-limiting example, the display portion 414 of the selector device 404 may be configured to display at least a portion of the user interface 106 of the vehicle messaging system 400. The operator (not shown) of the vehicle 2 may selectively operate the selector device 404 to navigate through the user interface 106 to select stored message 7, and/or input a customized message 5 to be displayed 15. It is to be understood that the operator (not shown) of the vehicle 2 may selectively interact with the switch mechanism 408 and/or the keyboard 412 of the selector device 404 to navigate through the user interface 106 of the vehicle messaging system 400.

In order to aid in navigating through the user interface 106 of the vehicle messaging system 400, the selector device 404 may include one or more directional push-buttons, joysticks and/or depressible joysticks 416. As illustrated in FIG. 8 of the disclosure and as a non-limiting example, the one or more directional push-buttons, joysticks and/or depressible joysticks 416 may be received and/or retained within at least a portion of the housing 206 of the selector device 404.

By attaching the selector device 404 to the steering wheel assembly 402, it minimizes the amount of time the operator (not shown) of the vehicle 2 needs to take their eyes off the road to interact with the vehicle messaging system 400 which aids in increasing the overall safety associated with the operation of the vehicle 2 and the vehicle messaging system 400.

Figure 9:
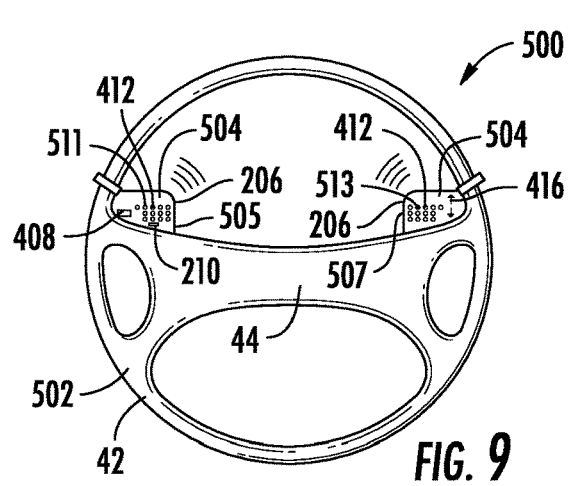
FIG. 9 is a schematic top-plan view of still yet another steering wheel assembly having a selector device according to still yet another embodiment of the disclosure.

FIG. 9 is a schematic top-plan view of still yet another steering wheel assembly 502 having a selector device according 504 to still yet another embodiment of the disclosure. The selector device 504 of the vehicle messaging system 500 illustrated in FIG. 9 is the same as the selector devices of the vehicle messaging systems 4, 100, 200, 300 and 400 described and illustrated in relation to FIGS. 1-8, except where specifically noted below. Additionally, the vehicle messaging system 500 illustrated in FIG. 9 is the same as the vehicle messaging system 4, 100, 200, 300 and 400 described and illustrated in relation to FIGS. 1-8, except where specifically noted below. As illustrated in FIG. 9 and as a non-limiting example, the selector device 504 of the vehicle messaging system 500 may be attached to at least a portion of the outer portion 42 and/or the inner hub portion 44 of the steering wheel assembly 502. It is within the scope of this disclosure and as a non-limiting example that the selector device 504 may be in communication with the vehicle messaging system 500 by using a wireless connection and/or a wired connection. As a non-limiting example, the selector device 304 may be in wireless communication with the vehicle messaging system 500 by using a Wi-Fi connection, a Bluetooth connection, an electromagnetic wave connection, a cellular connection and/or a radio wave connection.

In accordance with the embodiment illustrated in FIG. 9 and as a non-limiting example, the housing 206 of the selector device 504 may include a first housing portion 505 and a second housing portion 507. Additionally, in accordance with the embodiment illustrated in FIG. 9 and as a non-limiting example, the keyboard 412 may include a first keyboard portion 511 and a second keyboard portion 513. At least a portion of the first keyboard portion 511 may be disposed within at least a portion of the first housing portion 505 and at least a portion of the second keyboard portion 513 may be disposed within at least a portion of the second housing portion 507 of the housing 206 of the selector device 504. By separating the keyboard 412 and the housing 206 into a first portion 505 and 511 and a second portion 507 and 513, it aids in ensuring that that the operator (not shown) of the vehicle 2 keeps both hands on the steering wheel assembly 502 at all times during operation of the vehicle 2 and the vehicle messaging system 500. This aids in ensuring that the operator (not shown) of the vehicle 2 maintains optimal control of the vehicle 2 while still allowing the operator (not shown) to operate the vehicle messaging system 500. As a result, this provides a more robust, easy to operate and safe vehicle messaging system 500.

As best seen in FIG. 9 and as a non-limiting example, at least a portion of the switch mechanism 408 and the selector device microphone 210 may be disposed within at least a portion of the first housing portion 505 of the selector device 504. Additionally, as best seen in FIG. 9 of the disclosure and as a non-limiting example, at least a portion of the one or more directional push-buttons, joysticks and/or depressible joysticks 416 may be disposed within at least a portion of the second housing portion 507 of the selector device 504. It is within the scope of this disclosure and as a non-limiting example that the switch mechanism 408, the selector device microphone 210 and/or the one or more directional push-buttons 416 may be disposed within the first and/or second housing portions 505 and/or 507 of the selector device 504.

Figure 10:
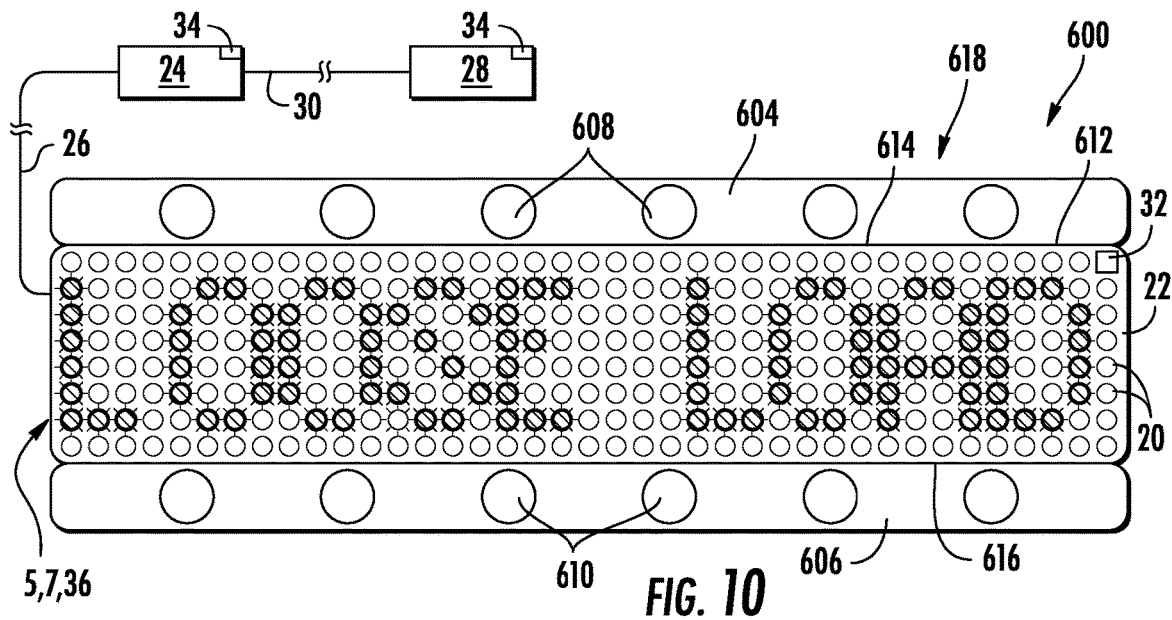
FIG. 10 is a schematic top-plan view of a display portion according to an alternative embodiment of the disclosure.

FIG. 10 is a schematic top-plan view of a display portion 618 of a vehicle messaging system 600 according to an alternative embodiment of the disclosure. The display portion 618 of the vehicle messaging system 600 illustrated in FIG. 10 is the same as the display portion 18 described and illustrated in relation to FIGS. 1-9, except where specifically noted below. Additionally, the vehicle messaging system 600 illustrated in FIG. 10 is the same as the vehicle messaging systems 4, 100, 200, 300, 400 and 500 described and illustrated in relation to FIGS. 1-9, except where specifically noted below. As illustrated in FIG. 10 and as a non-limiting example the display portion 618 of the vehicle messaging system 600 may be of a size and shape to display a stored message 7 and/or a customized message 5 desired by the operator (not shown) of the vehicle 2 and/or the one or more users (not shown) to be displayed 15 by the display portion 618.

In accordance with the embodiment illustrated in FIG. 10 and as a non-limiting example, the display portion 618 may include a brake light portion 604 and/or a reverse light or work light portion 606. As illustrated in FIG. 10 of the disclosure and as a non-limiting example, the brake light portion 604 may include one or more brake light LEDs 608 and the reverse light or work light portion 606 may include one or more reverse light or work light LEDs 610. It is to be understood that the one or more brake light LEDs 608 may be substantially red and the one or more reverse light or work light LEDs 610 may be substantially white. This will allow the display portion 618 of the vehicle messaging system 600 to display 15 a message 5 and/or 7 even when the brakes have been applied by the operator (not shown) of the vehicle 2. As a result, this allows the message 5 and/or 7 to be safely read by nearby motorists and/or vehicle passengers (not shown) being displayed 15 by the display portion 618 even when the vehicle 2 is stopped.

According to the embodiment illustrated in FIG. 10 of the disclosure and as a non-limiting example, at least a portion of the brake light portion 604 and the reverse light or work light portion 606 may be integrally connected to at least a portion of the outer periphery 612 of the display portion 618 of the vehicle messaging system 600. It is within the scope of this disclosure and as a non-limiting example that at least a portion of the brake light portion 604 may be integrally connected to at least a portion of a top portion 614 of the support member or housing member 22 of the display portion 618 of the vehicle messaging system 600. Additionally, it is within the scope of this disclosure and as a non-limiting example, that the reverse light or work light portion 606 may be integrally connected to at least a portion of a bottom portion 616 of the support member or housing member 22 of the display portion 618 of the vehicle messaging system 600.

In accordance with an alternative embodiment of the disclosure and as a non-limiting example, at least a portion of the brake light portion 604 and/or the reverse light or work light portion 606 may be integrally formed as part of the display portion 618 of the vehicle messaging system 600 as a single unitary component.

Figure 11:
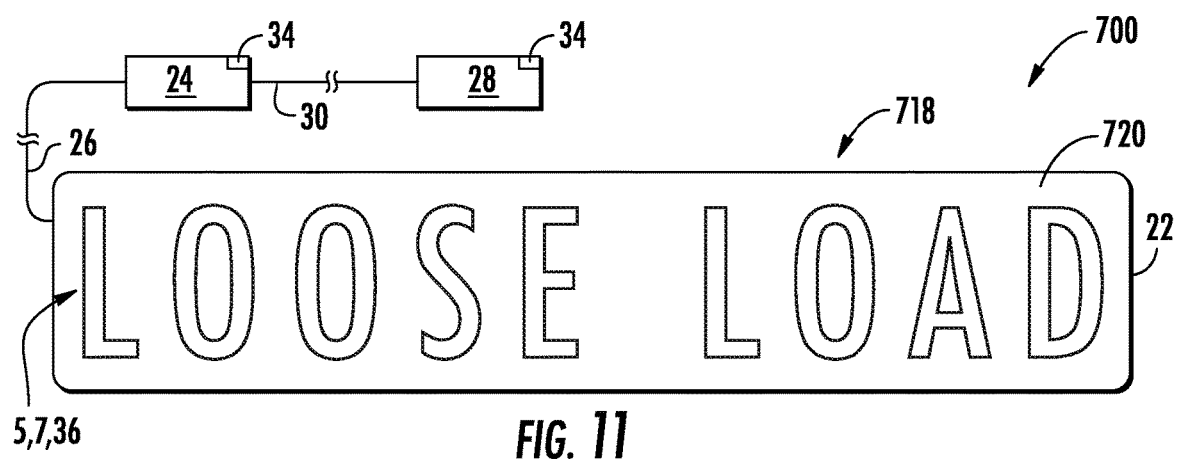
FIG. 11 is a schematic top-plan view of a display portion according to another embodiment of the disclosure.

FIG. 11 is a schematic top-plan view of a display portion 718 of s vehicle messaging system 700 according to another embodiment of the disclosure. The display portion 718 illustrated in FIG. 11 of the disclosure is the same as the display portion 18 and 618 described and illustrated in relation to FIGS. 1-10, except where specifically noted below. Additionally, the vehicle messaging system 700 illustrated in FIG. 11 is the same as the vehicle messaging systems 4, 200, 300, 400, 500 and 600 described and illustrated in relation to FIGS. 1-10 of the disclosure. As illustrated in FIG. 11 of the disclosure the display portion 718 does not include the plurality of LEDs 20.

In accordance with the embodiment illustrated in FIG. 11 of the disclosure and as a non-limiting example, the display portion 718 may include a display panel 720. It is within the scope of this disclosure and as a non-limiting example that the display panel 720 may be a liquid crystal display panel, a plasma display panel, an organic light emitting diode (OLED) display panel, an active matrix organic light emitting diode (AMOLED) display panel and/or a quantum dot display panel. It is to be understood that the display panel 720 may be in communication with the vehicle messaging system 700 and may be operably configured in order to display a customized and/or a stored message 5 and/or 7.

Figure 12:
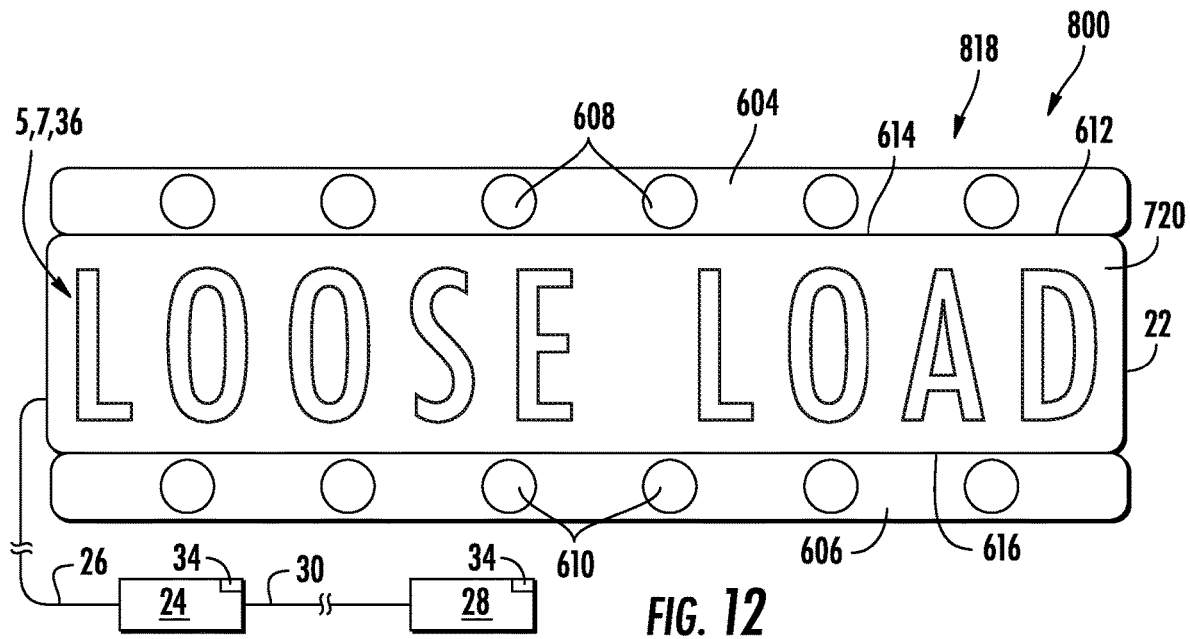
FIG. 12 is a schematic top-plan view of a display portion according to yet another embodiment of the disclosure.

FIG. 12 is a schematic top-plan view of a display portion 818 of a vehicle messaging system 800 according to yet another embodiment of the disclosure. The display portion 818 illustrated in FIG. 12 is the same as the display portions 18, 618 and 718 described and illustrated in relation to FIGS. 1-11, except where specifically noted below. Additionally, the vehicle messaging system 800 illustrated in FIG. 12 is the same as the vehicle messaging systems described and illustrated in relation to FIGS. 1-11, except where specifically noted below. As illustrated in FIG. 12 of the disclosure and as a non-limiting example, the display portion 818 may include the one or more display portions 720. Integrally connected to at least a portion of the outer periphery 612 of the support member or housing member 22 is the brake light portion 604 and/or the reverse light or work light portion 606 of the display portion 818. According to the embodiment illustrated in FIG. 12 and as a non-limiting example, at least a portion of the brake light portion 604 may be integrally connected to at least a portion of the top portion 614 of the support member or housing member 22. Additionally, at least a portion of the reverse light or work light portion 606 may be integrally connected to at least a portion of the bottom portion 616 of the support member or housing member 22 of the display portion 818.

In accordance with an alternative embodiment of the disclosure and as a non-limiting example, at least a portion of the brake light portion 604 and/or the reverse light or work light portion 606 may be integrally formed as part of the display portion 818 of the vehicle messaging system 800 as a single unitary component.

FIGS. 13-13B provide a schematic illustration of a portion of the vehicle 2 having a vehicle messaging system 900 according to an embodiment of the disclosure. The vehicle messaging system 900 illustrated in FIGS. 13-13B is the same as the vehicle messaging systems 4, 100, 200, 300, 400, 500, 600, 700 and 800 described and illustrated in relation to FIGS. 1-12, except where specifically noted below. As illustrated best seen in FIGS. 13A and 13B and as a non-limiting example, the vehicle 2 may include a windshield 902, a dash cover portion 904 and a heads-up display portion 906.

According to the embodiment illustrated in FIGS. 13-13B and as a non-limiting example, at least a portion of the heads-up display portion 906 may be integrally connected to at least a portion of an outer surface 905 the dash cover portion 904 within the interior portion 38 of the vehicle 2. In accordance with the embodiment illustrated in FIGS. 13-13B and as a non-limiting example, the heads-up display portion 906 may include a display panel 908 that is operably configured to display at least a portion of the user interface 106 and/or the message 36. When activated, at least a portion of the user interface 106 and/or the message 36 (custom 5 or stored 7) to be displayed by the vehicle messaging system 900 may be reflected on at least a portion of the windshield 902 of the vehicle 2. Once the user interface 106 and/or the message 36 has been reflected on the windshield 902, it is displayed in such a way that the user interface 106 and/or the message 36 is viewable and readable by the operator (not shown) of the vehicle 2 and/or the one or more users (not shown) of the vehicle messaging system 900. In order to be able to read the user interface 106 and/or the message 36 displayed on the windshield 902 of the vehicle 2 by the heads-up display portion 906, the display panel 908 of the heads-up display portion 906 may be operably configured to display a mirror image of the user interface 106 and/or the message 36 to be displayed by the display portion 18, 618, 718 and/or 818. It is therefore to be understood that the user interface 106 and/or the message 36 displayed by the display panel 908 of the heads-up display portion 906 may be a reverse mirror image of the user interface 106 and message 36 displayed in the information display portion 50 and/or the infotainment system 54 of the vehicle 2. As a result, the user interface 106 and/or message 36 reflected onto the windshield 902 is oriented in such a way that it is easily viewable and readable by the operator (not shown) of the vehicle and/or the one or more users (not shown) of the vehicle messaging system 900.

In accordance with an alternative embodiment of the disclosure and as a non-limiting example, at least a portion of the heads-up display portion 906 may be integrally formed as part of the dash cover portion 904 as a single unitary component.

Once the heads-up display portion 906 has been activated 3 and the user interface 106 and/or the message 36 has been reflected and displayed on the windshield 902 of the vehicle 2, the operator (not shown) of the vehicle 2 and/or one or more users (not shown) may be able to navigate the user interface 106 of the vehicle messaging system 900 in order to choose a stored message 7 or customized message 5 to be displayed 15. It is to be understood that the operator (not shown) of the vehicle 2 and/or one or more users (not shown) may navigate through the user interface 106 projected by the heads-up display portion 906 of the vehicle messaging system 900 by selectively interacting with the selector device 104, 204, 304, 404 and/or 504 of the vehicle messaging system 900. By having the user interface 106 and/or the message 36 to be displayed 15 by the display portion 18, 618, 718 and/or 818 on the windshield of the vehicle 2, it minimizes the amount of time the operator (not shown) of the vehicle 2 needs to take their eyes off the road to interact with the vehicle messaging system 900. This aids in increasing the overall safety associated with the operation of the vehicle 2 and the vehicle messaging system 900.

In accordance with an embodiment of the disclosure and as a non-limiting example, the heads-up display portion 906 may include a heads-up display portion microphone 910. The heads-up display portion microphone 910 may be operably configured to receive a customized message 5 for display 15 by the display portion 18, 618, 718 and/or 818 of the vehicle messaging system 900. The message 5 received by the heads-up display portion microphone 910 may then be analyzed by the vehicle messaging system 900, the one or more data processors 34, the one or more control units 24 and/or the communication bus 28 in order to translate the signals received by the heads-up display portion microphone 910 into the intended message 5.

Additionally, it is within the scope of this disclosure and as a non-limiting example that the heads-up display portion 906 may include one or more speakers 912 that are operably configured to audibly read out the message 5 and/or 7 intended to be displayed 15 by the vehicle messaging system 900. This provides the operator (not shown) of the vehicle 2 and/or the one or more users (not shown) of the vehicle messaging system 900 with an opportunity to confirm that the message 5 and/or 7 is correct before it is displayed 15 by the display portion 18, 618, 718 and/or 818.

Furthermore, it is within the scope of this disclosure and as a non-limiting example that the heads-up display portion 906 of the vehicle messaging system 900 may display the message 5 and/or 7 intended to be displayed 15 by the vehicle messaging system 900 for confirmation before being displayed 15 by the display portion 18, 618, 718 and/or 818. Once the message has been displayed by the heads-up display portion 906, it is reflected and displayed on the windshield 902 of the vehicle 2 to be read by the operator (not shown) of the vehicle 2 and/or the one or more users (not shown) of the vehicle messaging system 900.

Figure 14:
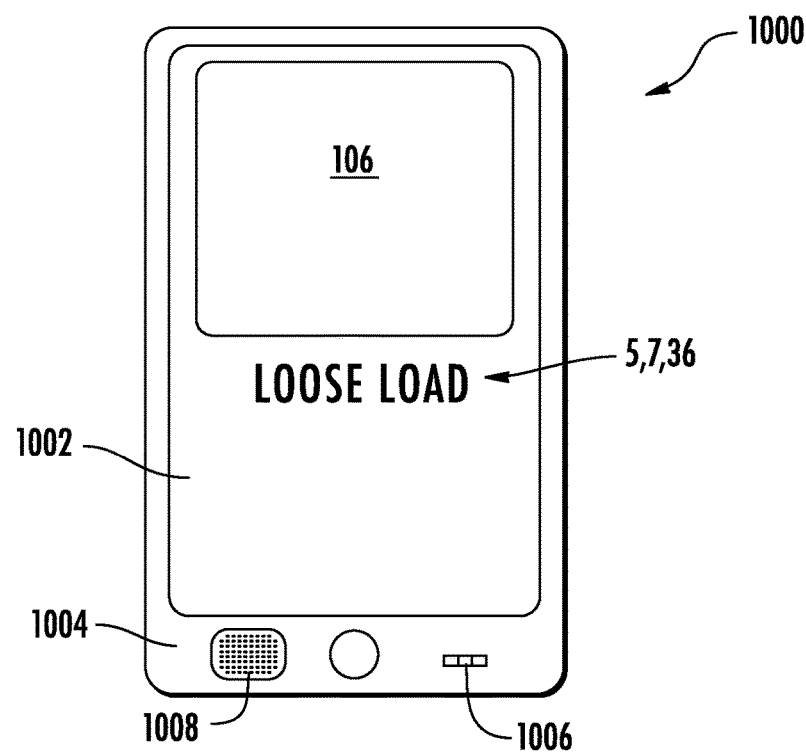
FIG. 14 is a schematic top-plan view of a selector device of the vehicle messaging system according to still yet a further embodiment of the disclosure.

FIG. 14 is a schematic top-plan view of a selector device 1004 of the vehicle messaging system 1000 according to still yet a further embodiment of the disclosure. The selector device 1004 illustrated in FIG. 14 is the same as the selector devices 104, 204, 304, 404 and 504 described and illustrated in relation to FIGS. 1-13B, except where specifically noted below. Additionally, the vehicle messaging system 1000 illustrated in FIG. 14 is the same as the vehicle messaging systems 4, 100, 200, 300, 400, 500, 600, 700, 800, and 900 described and illustrated in relation to FIGS. 1-13, except where specifically noted below. As illustrated in FIG. 14 of the disclosure and as a non-limiting example the selector device 1004 may be a mobile device. It is within the scope of this disclosure and as a non-limiting example that the selector device 1004 may be a mobile phone, a tablet computing device, a mobile computing device, a smart watch and/or a laptop computer that is operably configured to communicate with the vehicle messaging system 1000.

After a program or application has been downloaded to the selector device 1004, the selector device 1004 may be able to display at least a portion of the user interface 106 and/or the message 5 and/or 7 to be displayed 15 by the display portion 18, 618, 718 and/or 818 on a display panel 1002 of the selector device 1004. Once the user interface 106 has been opened on the selector device 1004, the operator (not shown) of the vehicle 2 and/or the one or more users (not shown) may be able to navigate through the user interface 106 in order to select a stored message 7 or input a customized message 5 to be displayed 15 by the vehicle messaging system 1000. By having the user interface 106 and/or the message 5 and/or 7 to be displayed 15 on the selector device 1004, it minimizes the overall amount of time the operator (not shown) of the vehicle 2 needs to take their eyes off the road to interact with the vehicle messaging system 1000. This aids in increasing the overall safety associated with the operation the vehicle 2 and the vehicle messaging system 1000. Additionally, by having the interface 106 and/or the message 5 and/or 7 to be displayed on the selector device 1004, it minimizes the amount of time the vehicle operator (not shown) needs to take their eyes off the road to interact with the vehicle messaging system 1000 by allowing one or more passengers (not shown) of the vehicle 2 to selectively operate the vehicle messaging system 1000.

According to the embodiment illustrated in FIG. 14 and as a non-limiting example, the selector device 1004 may include a selector device microphone 1006. The selector device microphone 1006 may be operably configured to input a customized message 7 for display 15 by the display portion 18, 618, 718 and/or 818 of the vehicle messaging system 1000. It is within the scope of this disclosure and as a non-limiting example that the selector device 1004 may include one or more speakers 1008 that are operably configured to audibly read out the message 5 and/or 7 intended to be displayed 15 by the vehicle messaging system 1000. This provides the operator (not shown) of the vehicle 2 and/or the one or more users (not shown) of the vehicle messaging system 1000 with an opportunity to confirm that the message 5 and/or 7 is correct before it is displayed 15 by the display portion 18, 618, 718 and/or 818. Furthermore, it is within the scope of this disclosure and as a non-limiting example that the selector device 1004 of the vehicle messaging system 1000 may display the message 5 and/or 7 intended to be displayed 15 by the vehicle messaging system 1000 for confirmation before being displayed 15 by the display portion 18, 618, 718 and/or 818.

Figure 15:
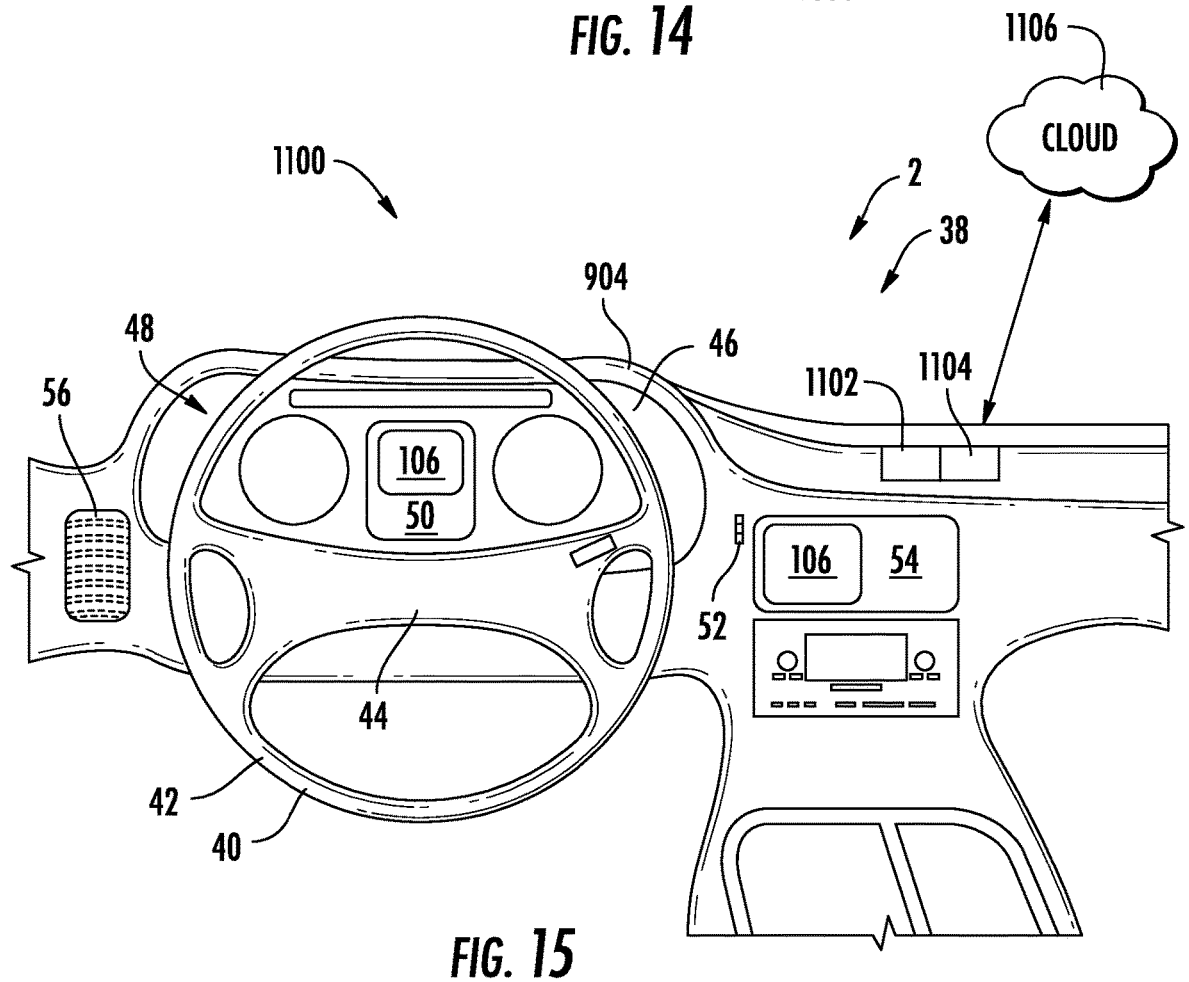
FIG. 15 is a schematic front facing view of a vehicle having a vehicle messaging system according to an embodiment of the disclosure.
Figure 15A:
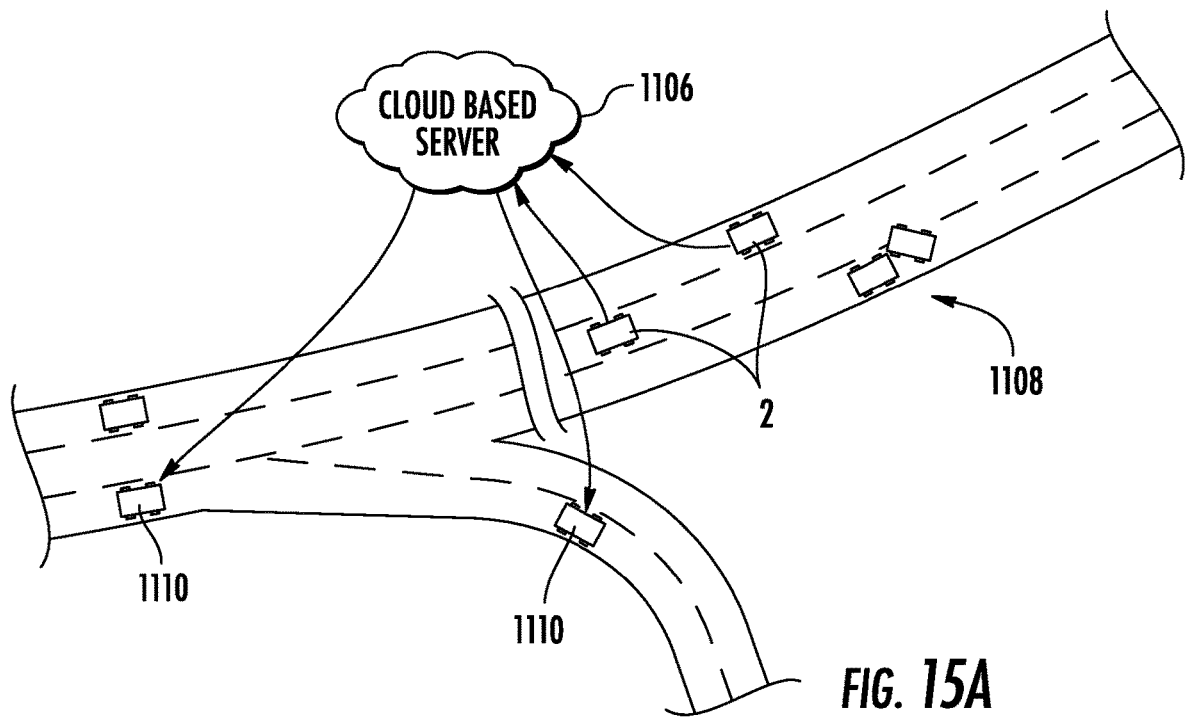
FIG. 15A provides a schematic top-plan view of one or more vehicles having the vehicle messaging system according to the embodiment of the disclosure illustrated in FIG. 15.

FIGS. 15 and 15A provide a schematic illustration of the vehicle 2 with a vehicle messaging system 1100 according to an embodiment of the disclosure. The vehicle messaging system 1100 illustrated in FIG. 15 is the same as the vehicle messaging systems 4, 100, 200, 300, 400, 500, 600, 700, 800, 900 and 1000 described and illustrated in relation to FIGS. 1-14, except where specifically noted below. As best seen in FIG. 15 of the disclosure and as a non-limiting example, the vehicle 2 and/or the vehicle messaging system 1100 may include a telemetrics unit 1102 and/or a Global Positioning System (GPS) unit 1104 that are selectively in communication with a cloud-based server 1106. It is within the scope of this disclosure and as a non-limiting example that the vehicle 2 and/or the vehicle messaging system 1100 may be in wired and/or wireless communication with the telemetrics unit 1102, the GPS unit 1104 and/or cloud-based server 1106 of the vehicle messaging system 1100. As a non-limiting example, the wireless connection between the vehicle 2 and/or the vehicle messaging system 1100 and the telemetrics unit 1102, the GPS unit 1104 and/or cloud-based server 1106 may be a Bluetooth connection, Wi-Fi connection, electromagnetic wave connection, cellular connection and/or a radio connection.

In accordance with the embodiment illustrated in FIG. 15 of the disclosure and as a non-limiting example, the GPS unit 1104 of the vehicle messaging system 1100 may be used in order to tag or identify the geographic location of the message 5 and/or 7 inputted into and displayed 15 by the vehicle messaging system 1100.

Once the geographic location of the message 5 and/or 7 has been determined, the vehicle messaging system 1100, the one or more control units 24 and/or the communication bus 28 of the vehicle 2 may communicate the message 5 and/or 7 to the telemetrics unit 1102 of the vehicle 2. After the message 5 and/or 7 has been received by the telemetrics unit 1102, the telemetrics unit 1102 may then communicate the message 5 and/or 7 to the cloud-based server 1106.

Once the message 36 has been received 19 by the cloud-based server 1106, the cloud-based server 1106 may then review and analyze the message in order to determine if the message 5 and/or 7 relates to a road and/or traffic condition 1108. After the cloud-based server has determined that the message 5 and/or 7 relates to a road and/or traffic condition (not shown), the cloud-based server 1106 may then determine 21 how many messages 5 and/or 7 relating to a road and/or traffic condition 1108 have been received by the cloud-based server 1106 within a geographic region. As a non-limiting example that the road and/or traffic condition 1108 may be vehicle accident, road closure, lane closure, slow traffic, vehicle break down, road maintenance and/or road work.

It is within the scope of this disclosure and as a non-limiting example that the cloud-based server 1106 may operably configures in order to determine the type of road and/or traffic condition 1108 experienced in a particular geographic region based on the messages 5 and/or 7 received within that geographic region.

Once the number of messages 5 and/or 7 relating to a road and/or traffic condition 1108 within a geographic region exceeds a pre-determined threshold, the cloud-based server 1106 may provide a positive identification of the existence of a road and/or traffic condition 1108. By waiting to provide a positive identification of a road and/or traffic condition 1108 until a pre-determined amount of messages 5 and/or 7 within a geographic region have been confirmed to relate to a rod and/or traffic condition 1108, it eliminates the possibility of false identifications. This will provide a more robust, reliable and effective system.

Vehicle owner(s), vehicle operator(s), route planning software providers and/or GPS navigation providers may be able to access and utilize the information gathered and/or analyzed by the cloud-based server 1106 relating to the number of vehicles experiencing the road and/or traffic condition 1108, the type of road and/or traffic condition 1108 and/or the geographic location of the road and/or traffic condition identified 1108. It is within the scope of this disclosure and as a non-limiting example, that the vehicle owner(s), vehicle operator(s), route planning software providers and/or GPS navigation providers may utilize the information collected and/or analyzed by the cloud-based server 1106 to re-route 23 one or more vehicles 1110 to avoid road and/or traffic condition 1108 identified. This will aid in providing one or more vehicles with a more efficient, robust and effective travel or route planning software or service.

It is within the scope of this disclosure and as a non-limiting example that one or more data processors of the vehicle messaging system 1100 may be operably configured to review and/or analyze the customized messages 5 and/or the selected messages 7 inputted into the vehicle messaging system 1100 by the operator (not shown) of the vehicle 2 or the one or more users (not shown). Once the one or more data processors have identified a message 5 and/or 7 relating to a road and/or traffic condition 1108, the geographic location of the message will be identified and both the message 5 and/or 7 and the location of the message 5 and/or 7 may be communicated to the telemetrics unit 1102. Once received by the telemetrics unit 1102, both the message 5 and/or 7 and the location of the message 5 and/or 7 may be be communicated to the cloud-based server 1106 for further analysis. By limiting the number of messages 5 and/or 7 sent to the telemetrics unit 1102 to only messages 5 and/or 7 relating to road and/or traffic conditions 1108, it reduces the overall amount of information sent to and/or received by the cloud-based server 1106. This aids in minimizing the overall information transmitted by the telemetrics unit 1102 to the cloud-based server 1106 which in turn minimizes the overall amount of information that needs to be analyzed by the cloud-based server 1106. As a result, the overall costs associated with the maintenance and operation of the system may be reduced and the overall computing efficiency of the cloud-based server 1106 can be increased.

Figure 16:
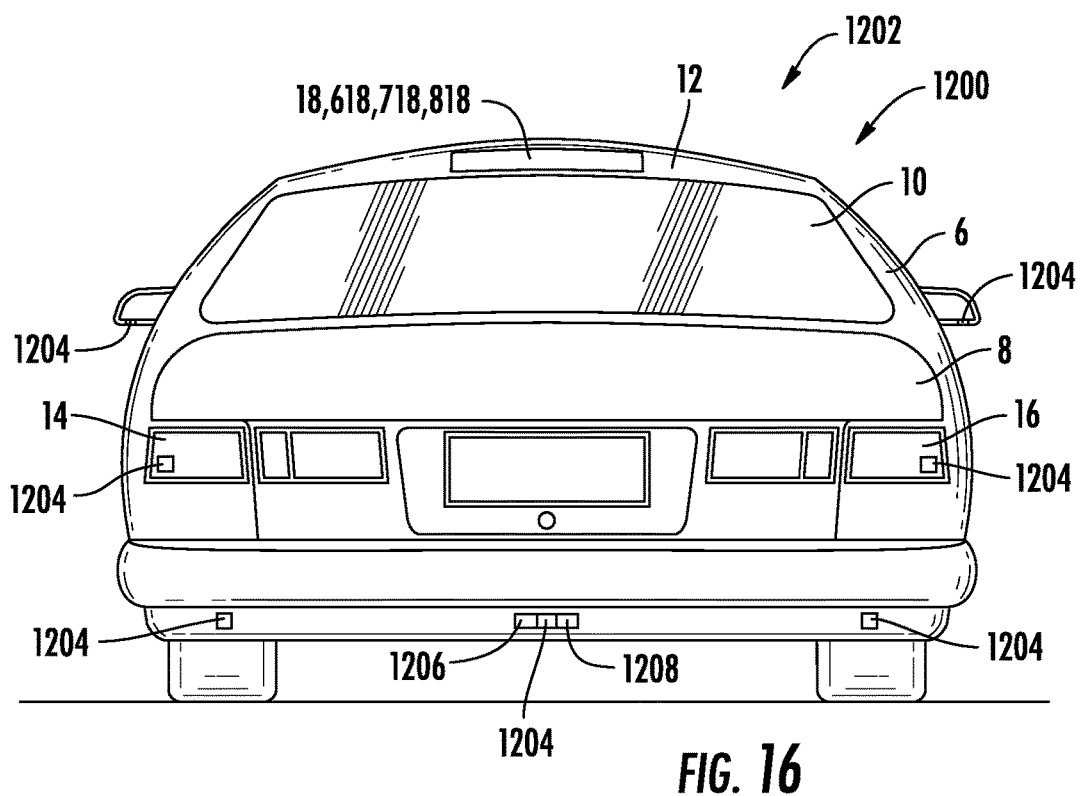
FIG. 16 is a schematic rear-view of a vehicle having a vehicle messaging system according to an embodiment of the disclosure.
Figure 18:
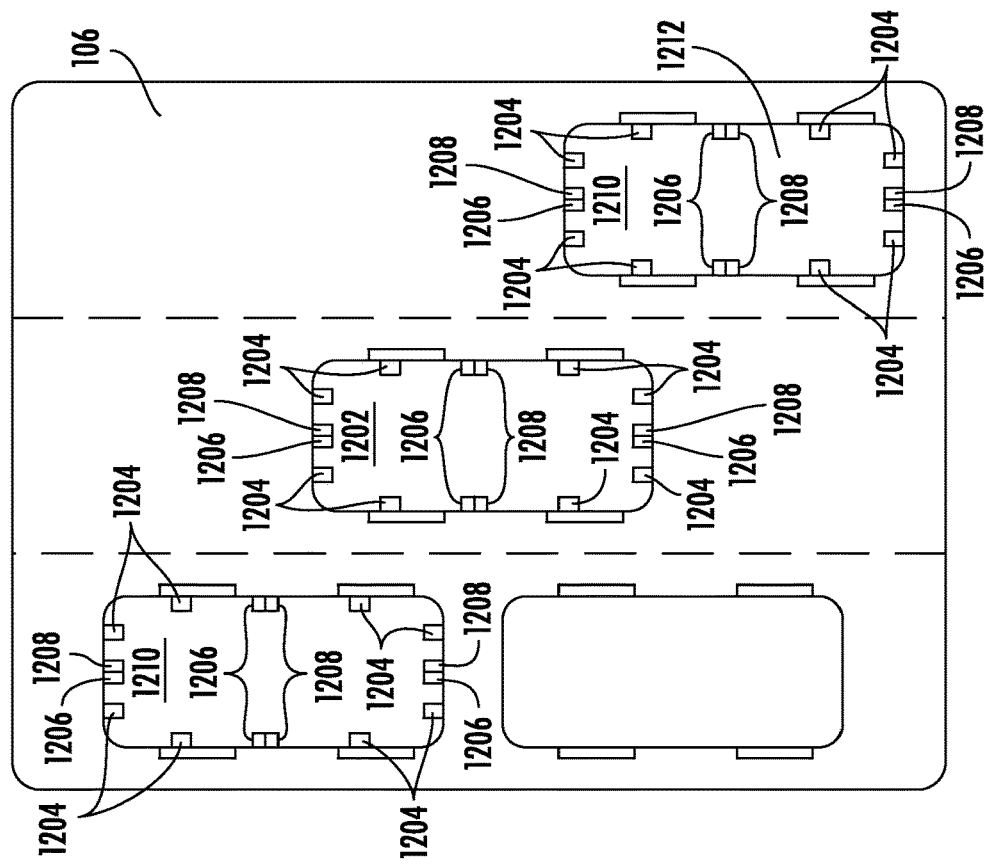
FIG. 18 is a schematic top-plan view of the user interface illustrated in FIG. 17 of the vehicle messaging system according to the embodiment illustrated in FIGS. 16 and 17 of the disclosure.
Figure 17:
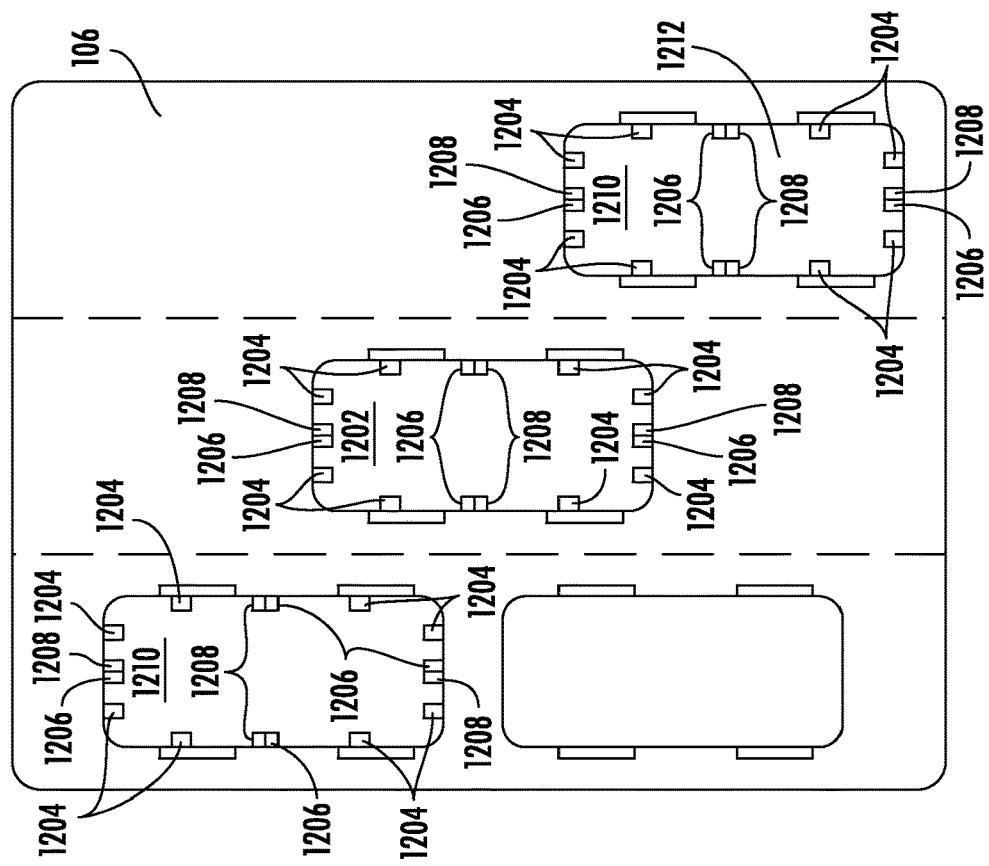
FIG. 17 is a schematic top-plan view of a user interface of the vehicle messaging system according to the embodiment illustrated in FIG. 16 of the disclosure.

FIGS. 16-18 provide a schematic illustration of a vehicle 1202 having a vehicle messaging system 1200 according to an embodiment of the disclosure. The vehicle 1202 and the vehicle messaging system 1200 illustrated in FIGS. 16-18 is the same as the vehicle 2 and the vehicle messaging systems 4, 100, 200, 300, 400, 500, 600, 700, 800, 900, 1000 and/or 1100 described and illustrated in relation to FIGS. 1-15, except where specifically noted below. As best seen in FIGS. 16-18 of the disclosure and as a non-limiting example, the vehicle 1202 may include one or more vehicle sensors 1204, one or more receivers 1206 and/or one or more transmitters 1208 disposed around the exterior of the vehicle 1202. The one of more vehicle sensors 1204, the one or more receivers 1206 and/or the one or more transmitters 1208 of the vehicle 1202 may be operably configured to selectively or continuously collect data relating to the presence of one or more additional vehicles 1210 equipped with the vehicle messaging system 1200, and/or the position and/or location of the one or more additional vehicles 1210 near the vehicle 1202 equipped with the vehicle messaging system 1200. It is within the scope of this disclosure and as a non-limiting example that the vehicle messaging system 1200 may begin tracking the position and/or location of the one or more additional vehicles 1210 around the vehicle 1202 after the one or more receivers 1206 have received a signal transmitted by the one or more transmitters 1208 of the one or more additional vehicles 1210 equipped with the vehicle messaging system 1200. This reduces the overall amount of time that the vehicle messaging system 1200 needs to track or monitor the position and/or location of the one or more additional vehicles 1210 equipped with the vehicle messaging system 1200. As a result, this provides vehicle messaging system 1200 that operates more efficiently. As a non-limiting example the one or more vehicle sensors 1204 may be one or more infra-red sensors, one or more sonar sensors, one or more position sensors, one or more vehicle position sensors and/or one or more receivers.

The data collected by the one or more vehicle sensors 1204 and/or the one or more receivers 1206 of the vehicle messaging system 1200 may be collected and/or analyzed by the one or more data processors of the vehicle messaging system 1200, the one or more control units 24 and/or the communication bus 28 of the vehicle 1202. Once the data has been received by the one or more data processors, it may be analyzed to identify or detect the presence of one or more additional vehicles 1210 equipped with the vehicle messaging system 1200 and/or to track the location of the one or more additional vehicles 1210 that are equipped with the vehicle messaging system 1200. According to the embodiment illustrated in FIGS. 17 and 18 and as a non-limiting example, the vehicle messaging system 1200 may utilize the data collected and/or analyzed by the one or more data processors in order to display the location of the one or more nearby additional vehicles 1210 identified within the user interface 106 of the vehicle messaging system 1200. It is within the scope of this disclosure and as a non-limiting example that the vehicle messaging system 1200 may continuously track and/or display the location of the one or more nearby additional vehicles 1210 identified on the user interface 106.

Once the location of the nearby additional vehicles 1210 has been displayed by the user interface 106 of the vehicle messaging system 1200, the operator (not shown) of the vehicle 1202 and/or the one or more users (not show) of the vehicle messaging system 1200 may select one or more vehicles 1212 to transmit the message 5 and/or 7 to. After one or more of the one or more nearby additional vehicles 1210 have been selected 1212, the operator (not shown) of the vehicle 2 and/or the one or more users (not show) may select a stored message 7 and/or input a customized message 7 to be transmitted to the selected vehicle 1212. The operator (not shown) of the vehicle 2 and/or the one or more users (not show) of the vehicle messaging system 1200 may then instruct the vehicle messaging system 1200 to transmit 25 the message 5 and/or 7 to the selected vehicle 1212. It is within the scope of this disclosure and as a non-limiting example that the one or more vehicles 1202, 1210 and/or 1212 equipped with the vehicle messaging system 1200 may be in wireless communication with each other by using a WiFi connection, a Bluetooth connection, an electromagnetic wave connection, a cellular connection and/or a radio wave connection.

After the message 5 and/or 7 has been received 27 by the one or more receivers 1206 and/or the telemetrics unit 1102 of the vehicle 1202 it may be analyzed by the one or more data processors of the vehicle messaging system 1200 of the selected vehicle 1212. Once analyzed, the message 5 and/or 7 transmitted 25 from the vehicle 1202 to the selected vehicle 1212 may be displayed 15 within the user interface 106 of the vehicle messaging system 1200 of the selected vehicle 1212. As a result, the desired message 5 and/or 7 may be displayed within the user interface 106 of the information display portion 50, the user interface 106 of the infotainment system 54, the user interface 106 displayed or projected by the heads-up display portion 906, the user interface 106 of the selector device 404 and/or 1004 of the vehicle messaging system 1200. It is therefore to be understood that the vehicle messaging system 1200 may allow direct communication vehicle-to-vehicle between the one or more vehicle operators (not shown) and/or one or more users (not shown) of the vehicle messaging system 1200 within their respective vehicles 1202, 1210 and/or 1212.

According to an embodiment of the disclosure and as a non-limiting example, the vehicle messaging system 1200 may be operably configured in order to identify the vehicle 1202 that transmitted 25 the message 5 and/or 7 to the selected vehicle 1212. This may be achieved by allowing the one or more data processors of the vehicle messaging system 1200, the one or more control units 24 and/or the communication bus 28 to determine which of the one or more receivers 1206 and/or telemetrics unit 1102 within the vehicle 1212 received 27 the message 5 and/or 7 transmitted 15. Additionally, this may be achieved by allowing the one or more data processors of the vehicle messaging system 1200, the one or more control units 24 and/or the communication bus 28 to determine which one of the one or more receivers 1206 and/or telemetrics unit 1102 received 27 the message 5 and/or 7 transmitted 15 first.

In accordance with this embodiment of the disclosure, the vehicle messaging system 1200 may be operably configured in order to identify and/or track the position of the vehicle 1202 that transmitted 25 the message 5 and/or 7 to the selected vehicle 1212. By providing the vehicle messaging system 1200 with the ability to identify and/or track the position of the vehicle 1202 that transmitted 25 the message 5 and/or 7, it allows the operator (not shown) of the selected vehicle 1212 and/or the one or more users (not shown) within the selected vehicle 1212 to know where the message 5 and/or 7 originated from. It is within the scope of this disclosure and as a non-limiting example that the user interface 106 of the vehicle messaging system 1200 may identify which vehicle 1202 transmitted 25 the message 5 and/or 7 to the selected vehicle 1212. Once identified, the operator (not shown) of the selected vehicle 1212 and/or the one or more users (not shown) of the vehicle messaging system 1200 within the selected vehicle 1212 may select the vehicle 1202 and transmit 25 a message 5 and/or 7 back to the vehicle 1202. This allows the operators (not shown) of the vehicle 1202 and 1212 and/or the users (not shown) of the vehicle messaging system 1200 within the vehicles 1202 and/or 1212 to quickly, easily, conveniently and efficiently have a conversation with each other.

Figure 19:
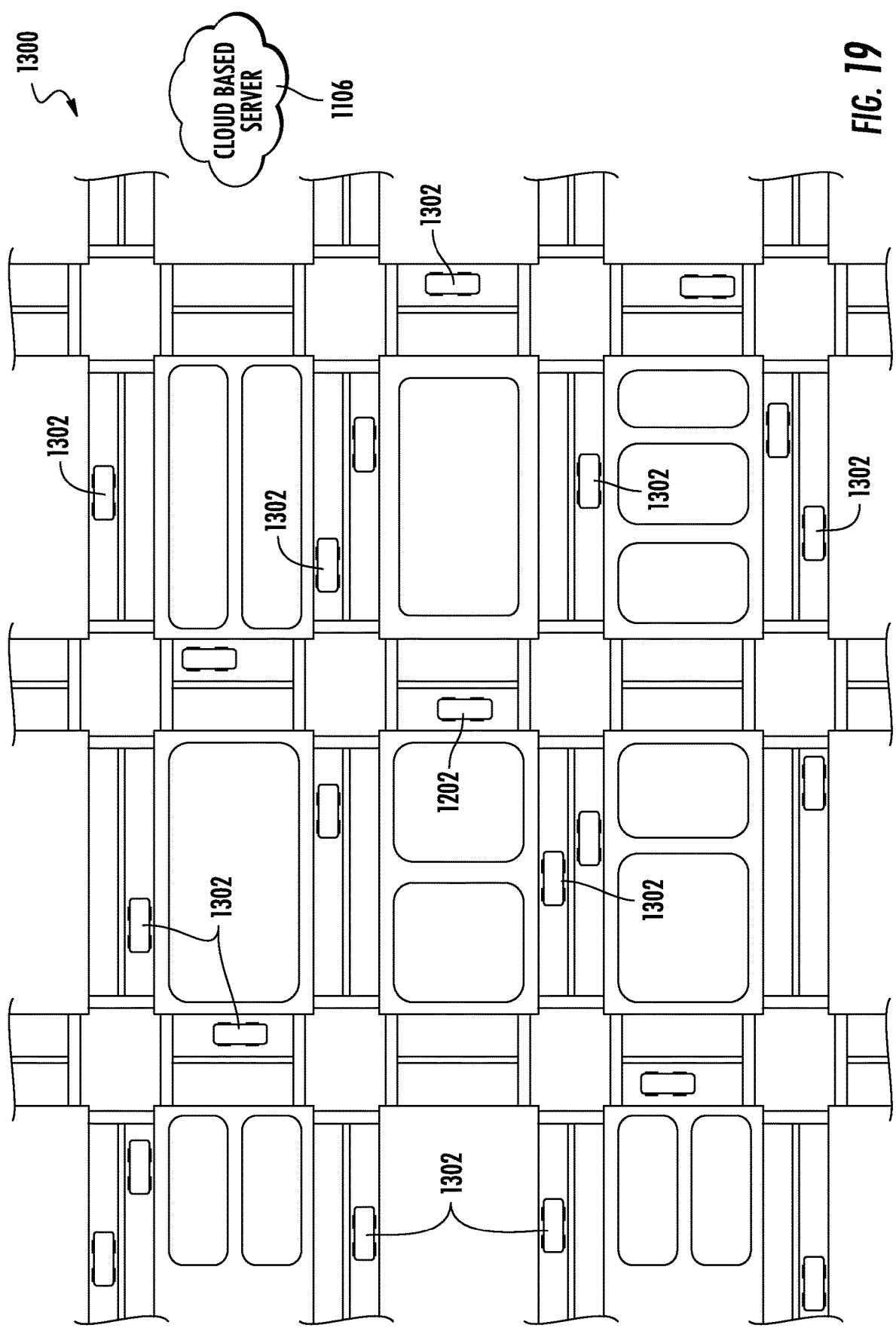
FIG. 19 is a schematic top-plan view of a vehicle messaging system according to another embodiment of the disclosure.

FIG. 19 is a schematic top-plan view of a vehicle messaging system 1300 according to another embodiment of the disclosure. The vehicle messaging system 1300 illustrated in FIG. 19 is the same as the vehicle messaging systems 4, 100, 200, 300, 400, 500, 600, 700, 800, 900, 1000, 1100 and/or 1200 described and illustrated in relation to FIGS. 1-18, except where specifically noted below. As illustrated in FIG. 19 and as a non-limiting example, the vehicle 1202 may include the vehicle messaging system 1300 according to an embodiment of the disclosure.

According to the embodiment illustrated in FIG. 19 the operator (not shown) of the vehicle 1202 and/or the one or more users (not shown) of the vehicle messaging system 1300 may be operably configured to transmit 25 the message 5 and/or 7 to one or more other vehicles 1302 equipped with the vehicle messaging system 1300. As previously discussed, the location of the vehicle 1202 transmitting 25 the message 5 and/or 7 may be determined by the GPS unit 1104 within the vehicle 1202 and utilized by the vehicle messaging system 1300. It is within the scope of this disclosure and as a non-limiting example that the message 5 and/or 7 transmitted 25 by the vehicle 1202 having the vehicle messaging system 1300 may be transmitted 25 to the one or more other vehicles 1302 within a pre-determined radius of the vehicle 1202. As a non-limiting example, the pre-determined radius may be set by the vehicle messaging system 1300 or a customized radius may be chosen by the operator (not shown) of the vehicle 1202 and/or the one or more users (not shown) of the vehicle messaging system 1300 by inputting the radius into the user interface 106.

In accordance with an embodiment of the disclosure and as a non-limiting example, the message 5 and/or 7 may be transmitted 25 by using the one or more transmitters 1208 and received by the one or more receivers 1206 of the vehicle 1202 equipped with the vehicle messaging system 1300. In accordance with an alternative embodiment of the disclosure and as a non-limiting example, the telemetrics unit 1102 of the vehicle 1202 may transmit 25 the radius and/or the message 5 and/or 7 to the cloud-based server 1106. Once the message 5 and/or 7 has been received 19 by the cloud-based server 1106, the cloud-based server 1106 may send the message 5 and/or 7 inputter by the operator (not shown) of the vehicle 1202 and/or the one or more users (not shown) of the vehicle messaging system 1300 to one or more other vehicles 1302 within that radius from the vehicle 1202. This allows the operator (not shown) of the vehicle 1202 and/or the one or more users (not shown) of the vehicle messaging system 1300 to simultaneously send out the message 5 and/or 7 to one or more other vehicles 1302 equipped with the vehicle messaging system 1300.

Once the message 5 and/or 7 is received 27 by the one or more other vehicles 1302, the message 5 and/or 7 may be read and/or heard within the one or more other vehicles 1302 via the vehicle messaging system 1300. After the message 5 and/or 7 has been received 27 by the one or more other vehicles 1302, the operator (not shown) of the one of more other vehicles 1302 and/or the one or more users (not shown) of the vehicle messaging system 1300 may transmit a message 5 and/or 7 back. The message 5 and/or 7 transmitted back to the operator (not shown) of the vehicle 1202 and/or the one or more users (not shown) of the vehicle messaging system 1300 within the vehicle 1202, may be received, read and/or read aloud to the user within the vehicle 1202 by the vehicle messaging system 1300. This allows the users (not shown) of the vehicle messaging system 1300 to interact with the various other users (not shown) of the vehicle messaging system 1300. It is within the scope of this disclosure and as a non-limiting example that the message 5 and/or 7 may be a question relating to where the best nearby coffee shop is, where the best nearby repair shop is, etcetera and the message 5 and/or 7 sent back may provide an answer to the user's question.

According to any alternative embodiment of the disclosure and as a non-limiting example, the message 5 and/or 7 transmitted back, may be transmitted to and received 19 by the cloud-based server 1106 of the vehicle messaging system 1300. Once the message 5 and/or 7 has been received 19 by the cloud-based server 1106, the cloud-based server 1106 may transmit the message 5 and/or 7 back to the vehicle 1202 that transmitted the original message 5 and/or 7. This will aid in providing a more robust and effective vehicle messaging system 1300 by allowing the messages 5 and/or 7 transmitted back and forth to be transmitted and/or received by vehicles 1202 and 1302 that are further apart from each other and/or in a more densely packed area like a city.

It is to be understood that the various embodiments described in this specification and as illustrated in the attached drawings are simply exemplary embodiments illustrating the inventive concepts as defined in the claims. As a result, it is to be understood that the various embodiments described and illustrated may be combined to from the inventive concepts defined in the appended claims.

In accordance with the provisions of the patent statutes, the present invention has been described to represent what is considered to represent the preferred embodiments. However, it should be note that this invention can be practiced in other ways than those specifically illustrated and described without departing from the spirit or scope of this invention.

What is claimed:

1. A method of operating a vehicle messaging system, comprising:
   providing a vehicle messaging system;
   inputting a customized radius into said vehicle messaging system;
   identifying one or more vehicles having said vehicle messaging system within said customized radius;
   selecting one or more of said one or more vehicles identified;
   inputting a message into said vehicle messaging system;
   transmitting said message inputted into said vehicle messaging system to said one or more vehicles selected; and
   receiving said message transmitted.

2. The method of operating said vehicle messaging system of claim 1, further comprising the step of:
   providing a display portion operably configured to display said message.

3. The method of operating said vehicle messaging system of claim 1, further comprising the step of:
   providing a user interface, wherein said user interface is selectively navigable to select a stored message and/or to input a customized message.

4. The method of operating said vehicle messaging system of claim 3, wherein said user interface of said vehicle messaging system is displayed on an information display portion of said vehicle, an infotainment system of said vehicle, and/or a heads-up display portion.

5. The method of operating said vehicle messaging system of claim 1, further comprising the step of:
   providing a selector device, wherein said selector device allows a vehicle operator and/or one or more users of said vehicle messaging system to select a stored message, to input a customized message into said vehicle messaging system, and/or navigate through a user interface of said vehicle messaging system.

6. The method of operating said vehicle messaging system of claim 5, wherein said selector device is a button integrally connected to a steering wheel assembly of said vehicle, is attached to at least a portion of said steering wheel assembly of said vehicle, a mobile phone, and/or a mobile computing device.

7. The method of operating said vehicle messaging system of claim 1, further comprising the steps of:
   providing a telemetrics unit and/or a GPS unit;
   identifying a geographic location of said message inputted into said vehicle messaging system with said GPS unit;
   transmitting said message to a cloud-based server by using said telemetrics unit;
   analyzing said message transmitted to said cloud-based server by said cloud-based server to determine if said message relates to a road condition and/or a traffic condition; and
   rerouting one or more vehicles based on said messages analyzed by said cloud-based server.

8. The method of operating said vehicle messaging system of claim 1, further comprising the steps of:
   providing a telemetrics unit and/or a GPS unit;
   analyzing said message inputted into said vehicle messaging system by said vehicle message system;
   determining if said message inputted relates to a road condition and/or a traffic condition;
   identifying a geographic location of said message inputted into said vehicle messaging system relating to a road condition and/or a traffic condition;
   transmitting said message determined to relate to a road condition and/or a traffic condition to a cloud-based server using said telemetrics unit; and
   rerouting one or more vehicles based on said messages analyzed by said vehicle messaging system and/or said cloud-based server.

9. The method of operating said vehicle messaging system of claim 1, further comprising the steps of:
   identifying a location of said one or more vehicles identified; and/or
   tracking or monitoring said location or position of said one or more vehicles identified.

10. The method of operating said vehicle messaging system of claim 9, wherein said one or more vehicles identified are identified by using one or more vehicle sensors.

11. The method of operating said vehicle messaging system of claim 10, wherein said one or more vehicle sensors are one or more infra-red sensors, one or more sonar sensors, one or more position sensors, and/or one or more vehicle position sensors.

12. The method of operating said vehicle messaging system of claim 9, wherein said one or more vehicles are identified by receiving a signal transmitted from said one or more vehicles having said vehicle messaging system.

13. The method of operating said vehicle messaging system of claim 1, further comprising the step of:
   identifying said vehicle that transmitted said message to said one or more vehicles.

14. The method of operating said vehicle messaging system of claim 13, further comprising the steps of:
   selecting said vehicle that transmitted said message;
   inputting a reply message;
   transmitting said reply message inputted; and
   receiving said reply message transmitted from said one or more vehicles by said vehicle.

15. The method of operating said vehicle messaging system of claim 1, further comprising the steps of:
   identifying the geographic location of said vehicle with a GPS unit;
   transmitting said message inputted to a plurality of other vehicles within a pre-determined radius from said vehicle; and
   receiving said message transmitted by said plurality of other vehicles.

16. The method of operating said vehicle messaging system of claim 15, further comprising the steps of:
   inputting a reply message into said vehicle messaging system by one or more other users in one or more of said plurality of other vehicles that received said message transmitted;
   transmitting said reply message inputted by said one or more other users within one or more of said plurality of other vehicles; and receiving said reply message transmitted by one or more of said plurality of other vehicles by said vehicle messaging system that transmitted said message.

17. The method of operating said vehicle messaging system of claim 15, wherein said message transmitted is received by a cloud-based server and then transmitted by said cloud-based server to a plurality of other vehicles within a pre-determined radius of said vehicle.

18. The method of operating said vehicle messaging system of claim 16, wherein said reply message transmitted by one or more of said plurality of other vehicles is received by a cloud-based server and then transmitted by said cloud-based server to said vehicle messaging system that transmitted said message.

19. The method of operating said vehicle messaging system of claim 1, wherein said method does not require said one or more vehicles to opt into a group of vehicles in order to communicate with each other.

20. The method of operating said vehicle messaging system of claim 2, further comprising the step of:
    displaying and/or audibly reading said message received.

21. The method of operating said vehicle messaging system of claim 2, wherein said display portion is viewable from an interior and/or an exterior of said one or more vehicles identified.

22. The method of operating said vehicle messaging system of claim 2, wherein said display portion is operably configured to display a brake light.

23. The method of operating said vehicle messaging system of claim 2, wherein said display portion is operably configured to display a brake light and said message inputted into said vehicle messaging system at the same time.

24. The method of operating said vehicle messaging system of claim 14, further comprising the step of:
    displaying and/or audibly reading said reply message received.

25. The method of operating said vehicle messaging system of claim 15, further comprising the step of:
    displaying and/or audibly reading said reply message received.

26. The method of operating said vehicle messaging system of claim 16, further comprising the step of:
    displaying and/or audibly reading said reply message received.

27. The method of operating said vehicle messaging system of claim 2, wherein at least a portion of a brake light portion is integrally connected to at least a portion of said support or housing portion of said display portion; and/or
    wherein at least a portion of a reverse light or work light portion is integrally connected to at least a portion of said display portion.

28. The method of operating said vehicle messaging system of claim 2, wherein at least a portion of a brake light portion is disposed above said display portion and at least a portion of a reverse light or work light portion is disposed below said display portion.

29. The method of operating said vehicle messaging system of claim 1, wherein said one or more vehicles identified are unknown.

* * * * *